United States Patent
Klumph

(10) Patent No.: US 11,288,505 B2
(45) Date of Patent: Mar. 29, 2022

(54) LABEL READER FOR AUTOMATIC DRUG COMPOUNDER

(71) Applicant: CareFusion 303, Inc., San Diego, CA (US)

(72) Inventor: Christopher Vernon Robert Klumph, Fort Collins, CO (US)

(73) Assignee: CAREFUSION 303, INC., San Diego, CA (US)

( * ) Notice: Subject to any disclaimer, the term of this patent is extended or adjusted under 35 U.S.C. 154(b) by 84 days.

(21) Appl. No.: 15/780,610

(22) PCT Filed: Nov. 22, 2016

(86) PCT No.: PCT/US2016/063393
§ 371 (c)(1),
(2) Date: May 31, 2018

(87) PCT Pub. No.: WO2017/095702
PCT Pub. Date: Jun. 8, 2017

(65) Prior Publication Data
US 2018/0357476 A1     Dec. 13, 2018

Related U.S. Application Data

(60) Provisional application No. 62/263,583, filed on Dec. 4, 2015.

(51) Int. Cl.
*G06K 9/00*     (2006.01)
*A61J 3/00*     (2006.01)
(Continued)

(52) U.S. Cl.
CPC .......... *G06K 9/00624* (2013.01); *A61J 1/201* (2015.05); *A61J 1/2089* (2013.01); *A61J 3/002* (2013.01);
(Continued)

(58) Field of Classification Search
CPC .......... A61J 1/201; A61J 1/2089; A61J 3/002; A61J 1/10; A61J 1/16; A61J 2200/74;
(Continued)

(56) References Cited

U.S. PATENT DOCUMENTS 3,587,856 A * 6/1971 Lemelson ................. B07C 3/18
                                                      209/3.3
3,811,548 A * 5/1974 Neff ...................... B23Q 7/1489
                                                      198/345.3
(Continued)

FOREIGN PATENT DOCUMENTS

| CA | 2760975 A1 | 11/2010 |
|---|---|---|
| CN | 101644664 A | 2/2010 |

(Continued)

OTHER PUBLICATIONS

Tayilor, "https://taylormhc.com/conveyor-belts-timing-hinged-conveyor-drive-motors-servo-ac-dc-rollers-reducers" (Year: 2021).*

(Continued)

*Primary Examiner* — Mekonen T Bekele
(74) *Attorney, Agent, or Firm* — Morgan, Lewis & Bockius LLP

(57) ABSTRACT

An automatic drug compounder system may be provided with various components and capabilities for reconstituting a drug in a vial and providing the reconstituted drug to a receiving container. The system may include a camera for capturing images of the vial and processing circuitry for extracting information such as a lot number and an expiration date from the images. The system may rotate the vial while capturing the images to capture images of the entire vial. The processing circuitry may search a portion of the image for the lot number and expiration date, the portion based on stored information. The stored information may include a location, orientation, font size, or font color for printed information for a particular vial. The stored infor- (Continued)

mation may be retrieved based on a bar code read by the system.

21 Claims, 28 Drawing Sheets

(51) Int. Cl.
*A61J 1/20* (2006.01)
*H04N 5/225* (2006.01)
*A61J 1/10* (2006.01)
*A61J 1/16* (2006.01)

(52) U.S. Cl.
CPC ....... *G06K 9/00409* (2013.01); *H04N 5/2256* (2013.01); *H04N 5/2257* (2013.01); *A61J 1/10* (2013.01); *A61J 1/16* (2013.01); *A61J 2200/74* (2013.01); *A61J 2205/10* (2013.01)

(58) Field of Classification Search
CPC ............ A61J 2205/10; G06K 9/00409; G06K 9/00624; H04N 5/2256; H04N 5/2257; B65B 3/003; B65C 9/0062; B65C 9/067; B65C 9/40; B65C 9/46
See application file for complete search history.

(56) References Cited

U.S. PATENT DOCUMENTS

| | | | |
|---|---|---|---|
| 5,062,774 A | | 11/1991 | Kramer et al. |
| 5,214,713 A | * | 5/1993 | Juvinall ............. G01N 21/8851 250/223 B |
| 5,233,186 A | * | 8/1993 | Ringlien ................ G01N 21/90 250/223 B |
| 5,259,913 A | * | 11/1993 | Stover ..................... B65C 9/045 156/447 |
| 5,405,015 A | * | 4/1995 | Bhatia ................... B07C 5/3408 209/524 |
| 5,651,846 A | * | 7/1997 | Hurst ...................... B08B 9/083 15/59 |
| 5,661,954 A | * | 9/1997 | Ivanov .................... B65B 35/26 53/116 |
| 5,717,486 A | * | 2/1998 | Burri .................. G01N 21/9081 209/576 |
| 8,231,749 B2 | * | 7/2012 | Dent ..................... G09F 3/0288 156/64 |
| 8,986,476 B2 | | 3/2015 | Dent et al. |
| 9,101,392 B2 | | 8/2015 | Okuma |
| 9,937,100 B1 | * | 4/2018 | Joplin .................... G06Q 10/08 |
| 2002/0007671 A1 | | 1/2002 | Lavi et al. |
| 2003/0034227 A1 | * | 2/2003 | Gerber ................. B65G 47/847 198/473.1 |
| 2004/0026442 A1 | | 2/2004 | Hutchinson |
| 2004/0241041 A1 | | 12/2004 | Woodworth et al. |
| 2007/0125442 A1 | | 6/2007 | Tribble et al. |
| 2008/0056556 A1 | | 3/2008 | Eller et al. |
| 2008/0134633 A1 | * | 6/2008 | Zwilling ................... B65C 9/46 53/135.1 |
| 2009/0149985 A1 | * | 6/2009 | Chirnomas .......... G06Q 10/083 700/215 |
| 2010/0089803 A1 | * | 4/2010 | Lavi ...................... B07C 5/3412 209/546 |
| 2010/0141756 A1 | * | 6/2010 | Grote ..................... G01B 11/04 348/127 |
| 2010/0291619 A1 | | 11/2010 | Robinson et al. |
| 2012/0267032 A1 | | 10/2012 | Dent et al. |
| 2013/0070084 A1 | * | 3/2013 | Fukuda .............. G01N 21/9018 348/127 |
| 2014/0131534 A1 | * | 5/2014 | Okuma ................... B65B 3/006 248/213.2 |
| 2015/0227804 A1 | * | 8/2015 | Kobayashi ............. G06K 9/209 382/142 |
| 2016/0012305 A1 | * | 1/2016 | Cocquelin ................. B07C 5/10 382/199 |
| 2016/0175785 A1 | * | 6/2016 | Li ........................... A47J 31/00 366/163.2 |
| 2016/0200462 A1 | * | 7/2016 | Kriheli ................ G07F 17/0092 700/214 |

FOREIGN PATENT DOCUMENTS

| | | |
|---|---|---|
| CN | 103282011 | 9/2013 |
| CN | 204636988 | 9/2015 |
| EP | 0155560 | 9/1985 |
| JP | S5828618 | 6/1983 |
| JP | 2010096515 A | 4/2010 |
| JP | 2014224807 A | 12/2014 |
| JP | 2016536079 A | 11/2016 |
| WO | WO-2010132741 A3 | 11/2010 |
| WO | WO-2015029018 A1 | 3/2015 |

OTHER PUBLICATIONS

Chinese Office Action for Application No. 201680079765.6, dated Dec. 4, 2019, 16 pages.
International Search Report and Written Opinion for Application No. PCT/US2016/063393, dated Apr. 19, 2007, 13 pages.
Chinese Office Action for Application No. 201680079765.6, dated Aug. 13, 2020, 16 pages.
Extended European Search Report for Application No. 201555369.0, dated Mar. 11, 2020, 8 pages.
Chinese Office Action for Application No. 201680079765.6, dated Jan. 21, 2021, 14 pages including translation.
Japanese Office Action for Application No. 2018529057, dated Dec. 10, 2020, 11 pages including translation.
Israel Office Action for Application No. 259580, dated Mar. 15, 2021, 6 pages including translation.

* cited by examiner

LABEL READER FOR AUTOMATIC DRUG COMPOUNDER

CROSS-REFERENCE TO RELATED APPLICATIONS

This application is a national stage of International Application No. PCT/US2016/063393, entitled "LABEL READER FOR AUTOMATIC DRUG COMPOUNDER," filed Nov. 22, 2016, which claims priority to U.S. Provisional Patent Application Serial No. 62/263,583, entitled "LABEL READER FOR AUTOMATIC DRUG COMPOUNDER," filed Dec. 4, 2015, the disclosures of which are hereby incorporated by reference in their entirety.

TECHNICAL FIELD

The present disclosure generally relates to an apparatus that reconstitutes, mixes, and delivers a drug from a vial to a receiving container. Specifically, the present disclosure relates to a vial label reader for an automatic drug compounder.

BACKGROUND

Pharmaceutical compounding is the practice of creating a specific pharmaceutical product to fit the unique need of a patient. In practice, compounding is typically performed by a pharmacist, tech or a nurse who combines the appropriate ingredients using various tools. One common form of compounding comprises the combination of a powdered drug formulation with a specific diluent to create a suspended pharmaceutical composition. These types of compositions are commonly used in intravenous/parenteral medications. It is vital that the pharmaceuticals and diluents are maintained in a sterile state during the compounding process, and there exists a need for automating the process while maintaining the proper mixing characteristics (i.e. certain pharmaceuticals must be agitated in specific ways so that the pharmaceutical is properly mixed into solution but the solution is not frothed and air bubbles are not created). There exists a need for a compounding system that is easy to use, may be used frequently, efficiently, is reliable, and reduces user error.

SUMMARY

An automatic drug compounder system may be provided with various components and capabilities for reconstituting a drug in a vial and providing the reconstituted drug to a receiving container. The system may include a camera for capturing images of the vial and processing circuitry for extracting information such as a lot number and an expiration date from the images.

In accordance with an embodiment, a compounder system is provided that includes a vial tray having a vial opening for receiving a vial containing a drug; a camera; a first motor configured to rotate the vial tray to move the vial to an imaging position; a second motor configured to rotate the vial while the camera captures images of a label on the vial; and processing circuitry configured to extract a lot number and an expiration date from the images.

In accordance with another embodiment, a method is provided that includes providing a vial having a label in a vial tray of a compounder system; moving the vial, with the vial tray, to an imaging location; rotating the vial while the vial is in the vial tray at the imaging location; capturing at least one image of the label while rotating the vial; and determining at least one of a lot number and an expiration date from the at least one image.

In accordance with another embodiment, a compounder system is provided that includes a carousel support frame configured to rotate a carousel of pump cartridges; a motor mounted to the carousel support frame; a drive mechanism configured to rotate the carousel; a vial tray interposed at least partially between the drive mechanism and the carousel support frame, wherein the drive mechanism is configured to rotate the vial tray and the carousel; and a camera, wherein the camera is configured to capture images of a vial in the vial tray while the motor rotates the vial.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

The present system comprises multiple features and technologies that in conjunction form a compounding system that can efficiently reconstitute pharmaceuticals in a sterile environment and deliver the compounded pharmaceutical to a delivery bag for use on a patient.

Figure 1:
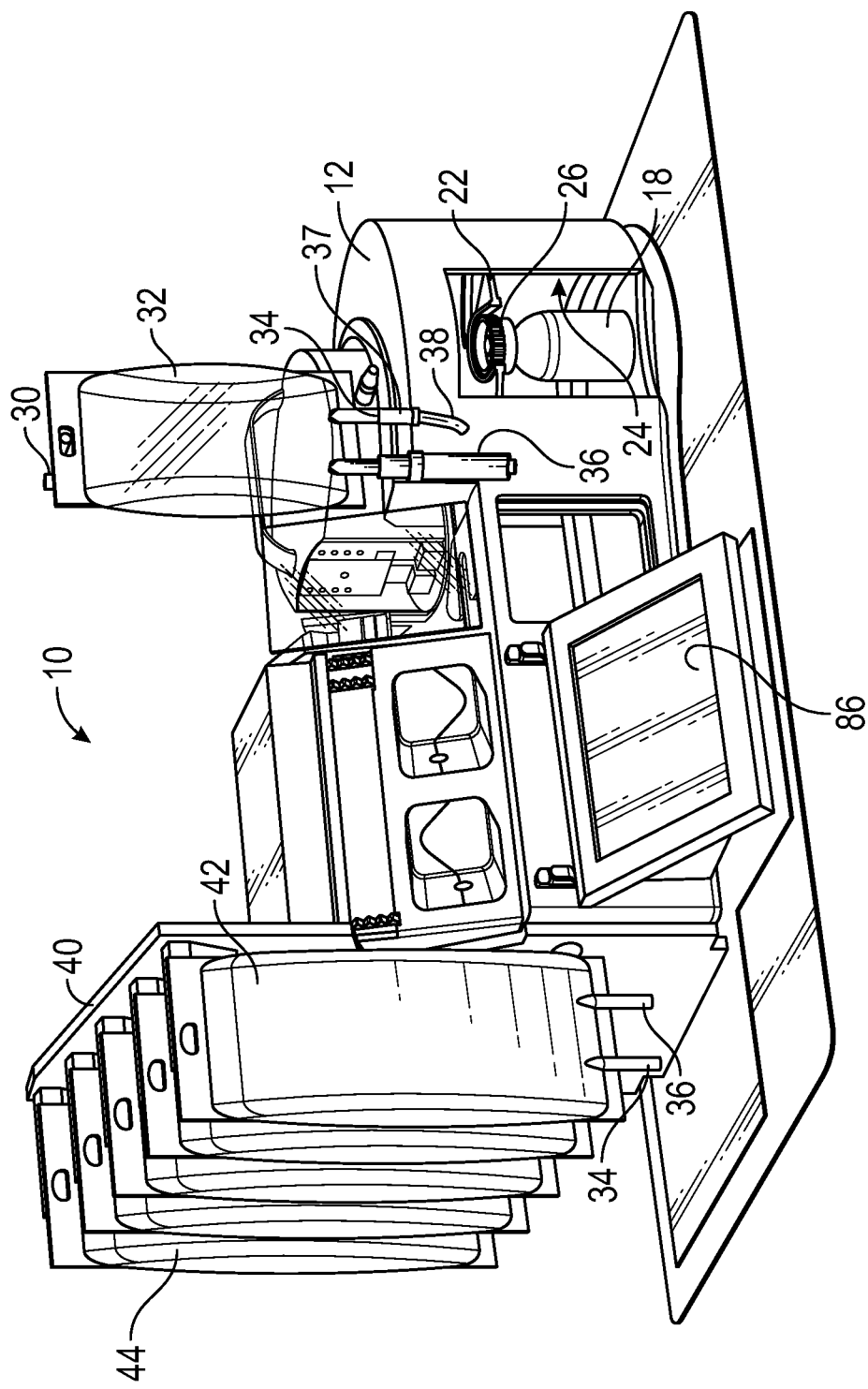
FIG. 1 illustrates a front perspective view of an example of an exemplary embodiment of a compounding system in accordance with aspects of the present disclosure.
Figure 2:
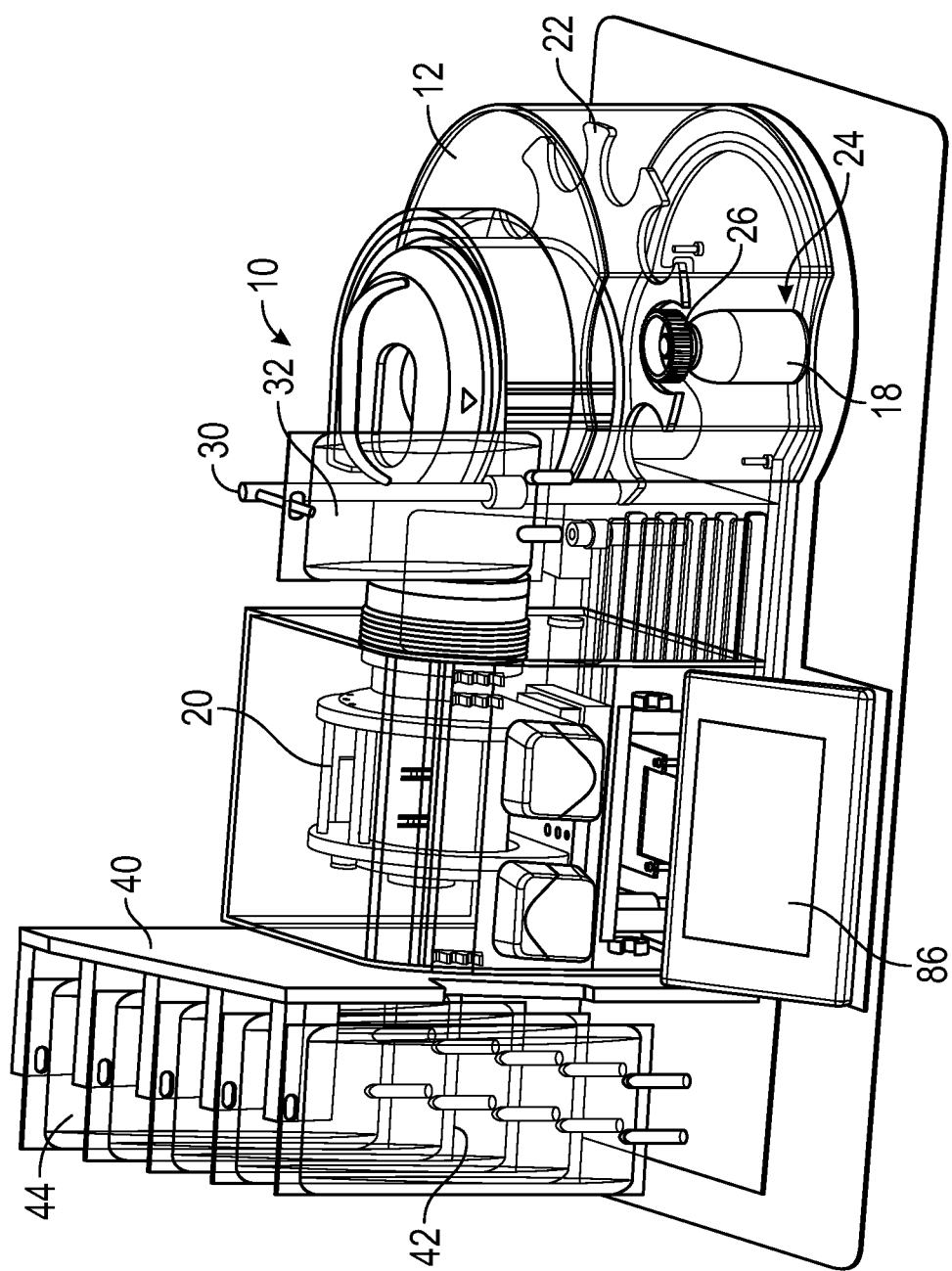
FIG. 2 illustrates a front perspective view of the compounding system of FIG. 1 with a transparent housing in accordance with aspects of the present disclosure.
Figure 3:
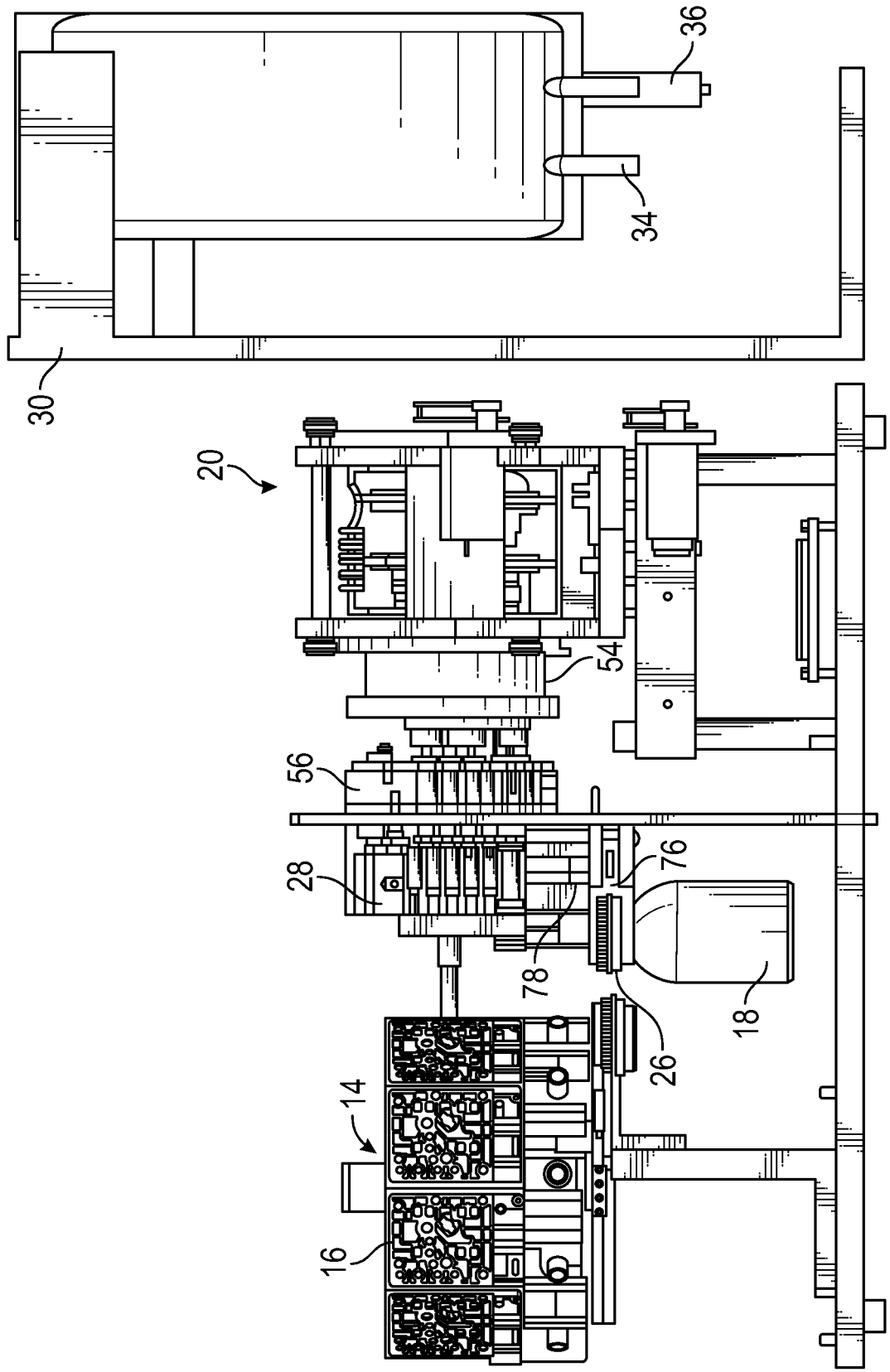
FIG. 3 illustrates a side view of the compounding system of FIG. 1 with the housing removed in accordance with aspects of the present disclosure.

FIG. 1 illustrates a compounder system 10 according to an embodiment. FIG. 2 illustrates the system 10 with a transparent outer housing 12 and FIG. 3 illustrates the system with the housing removed. The system comprises a carousel assembly 14 that contains up to 10 individual cartridges 16. The carousel 14 can hold more or less cartridges 16 if desired. The cartridges 16 are disposable and provide unique fluid paths between a vial 18 containing a powdered drug (or concentrated liquid drug), multiple diluents, and a receiving container. The cartridges 16 may, if desired, also provide a fluid path to a vapor waste container. However, in other embodiments, filtered or unfiltered non-toxic waste may be vented from the compounder to the environment reducing or eliminating the need for a waste port. Each cartridge contains a piston pump and valves that control the fluid intake, outtake, and fluid path selection during the steps of the compounding process as the fluid moves through the cartridge and into a receiving container.

The carousel assembly 14 is mounted on the apparatus such that it can rotate to bring different cartridges 16 into alignment with the pump drive mechanism 20. The carousel 14 is typically enclosed within a housing 12 that can be opened in order to replace the carousel 14 with a new carousel 14 after removing a used one. As illustrated, the carousel 14 can contain up to 10 cartridges 16, allowing a particular carousel to be used up to 10 times. In this configuration, each carousel assembly can support, for example, 10 to 100 receiving containers, depending on the type of compounding to be performed. For example, for hazardous drug compounding, a carousel assembly can support compounding to ten receiving containers. In another example, for non-hazardous drug compounding such as antibiotic or pain medication compounding, a carousel assembly can support compounding to 100 receiving containers. The housing 12 also includes a star wheel 22 positioned underneath the carousel 14. The star wheel 22 rotates vials 18 of pharmaceuticals into position either in concert with, or separate from, the specific cartridges 16 on the carousel 14. The housing 12 may also include an opening 24 for loading the vials 18 into position on the star wheel 22.

Each one of the cartridges 16 in the carousel 14 is a disposable unit that includes multiple pathways for the diluent and vapor waste. Each cartridge 16 is a small, single disposable unit that may also include a "backpack" in which a tube for connection to the receiving container (e.g., an IV bag, a syringe, or an elastomeric bag) may be maintained. Each cartridge 16 also may include a pumping mechanism such as a piston pump for moving fluid and vapor through the cartridge 16 as well as a duel lumen needle in a housing that can pierce a vial puck 26 on top of a vial 18 once the vial 18 has been moved into position by the pump drive mechanism 20. For example, the needle may pierce the vial puck 26 via the compressive action of the vial puck 26, which is moved towards the needle. Each cartridge 16 also includes a plurality of ports designed to match up with the needles of a plurality of diluent manifolds. Each cartridge 16 also includes openings to receive mounting posts and a locking bayonet from the pump head assembly 28. Although a locking bayonet is described herein as an example, other locking mechanisms may be used to retrieve and lock a cartridge to the pump head (e.g., grippers, clamps, or the like may extend from the pump head). Each cartridge 16 also includes openings allowing valve actuators from the pump motor mechanism to interact with the valves on each cartridge 16.

Adjacent the housing 12 that holds the vials 18 and the carousel 14 is an apparatus 30 for holding at least one container 32, such as an IV bag 32 as shown in the figures. The IV bag 32 typically has two ports such as ports 34 and 36. For example, in one implementation, port 34 is an intake port 34 and port 36 is an outlet port 36. Although this implementation is sometimes discussed herein as an example, either of ports 34 and 36 may be implemented as an input and/or outlet port for container 32. For example, m another implementation, an inlet 34 for receiving a connector at the end of tubing 38 may be provided on the outlet port 36. In the embodiment shown, the IV bag 32 hangs from the holding apparatus 30, which, in one embodiment is a post with a hook as illustrated in FIGS. 1-3. One or more of the hooks for hanging containers such as diluent containers, receiving containers, or waste containers may be provided with a weight sensor such as a load cell that detects and monitors the weight of a hung container. The holding apparatus 30 can take any other form necessary to position the IV bag 32 or other pharmaceutical container. Once the IV bag 32 is positioned on the holding apparatus 30, a first tube 38 (a portion of which is shown in FIG. 1) is connected from a cartridge 16 on the carousel 14 to the inlet 34 of the IV bag 32. For example, the first tube may be housed in a backpack attached to the cartridge and extended from within the backpack (e.g., by an operator or automatically) to reach the IV bag 32. A connector 37 such as a Texium® connector may be provided on the end of tube 38 for connecting to inlet 34 of receiving container 32.

On the opposite side of the compounder 10 is an array of holding apparatuses 40 for holding multiple IV bags 32 or other containers. In the illustrated version of the compounder 10, five IV bags 42, 44 are pictured. Three of these bags 42 may contain diluents, such as saline, D5W or sterile water, although any diluent known in the art may be utilized. An additional bag in the array may be an empty vapor waste bag 44 for collecting waste such as potentially hazardous or toxic vapor waste from the mixing process. An additional bag 44 may be a liquid waste bag. The liquid waste bag may be configured to receive non-toxic liquid waste such as saline from a receiving container. Liquid waste may be pumped to the waste bag via dedicated tubing using a mechanical pump. In operation, diluent lines and a vapor waste line from the corresponding containers 42 and 44 may each be connected to a cartridge 16 through a disposable manifold.

The compounding system 10 also includes a specialized vial puck 26 designed to attach to multiple types of vials 18. In operation, the vial puck 26 is placed on top of the vial 18 containing the drug in need of reconstitution. Once the vial puck 26 is in place, the vial 18 is loaded into the star wheel 22 of the compounder 10. Mating features on the vial puck 26 provide proper alignment both while the vial puck 26 is in the star wheel 22 and when the vial puck 26 is later rotated into position so that the compounder 10 can remove it from the star wheel 22 for further processing.

Figure 4:
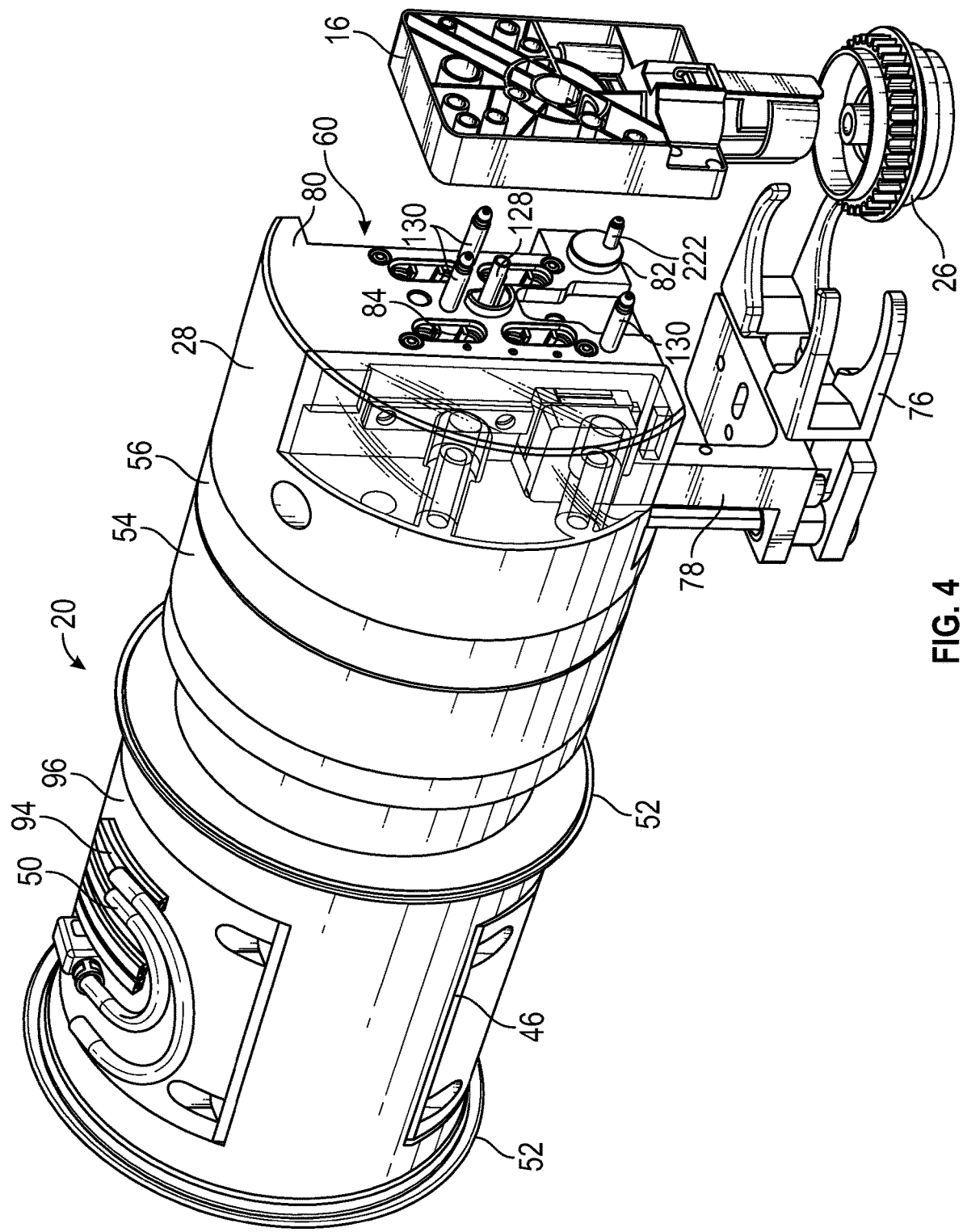
FIG. 4 illustrates a perspective view of an exemplary embodiment of a pump drive mechanism in accordance with aspects of the present disclosure.
Figure 5:
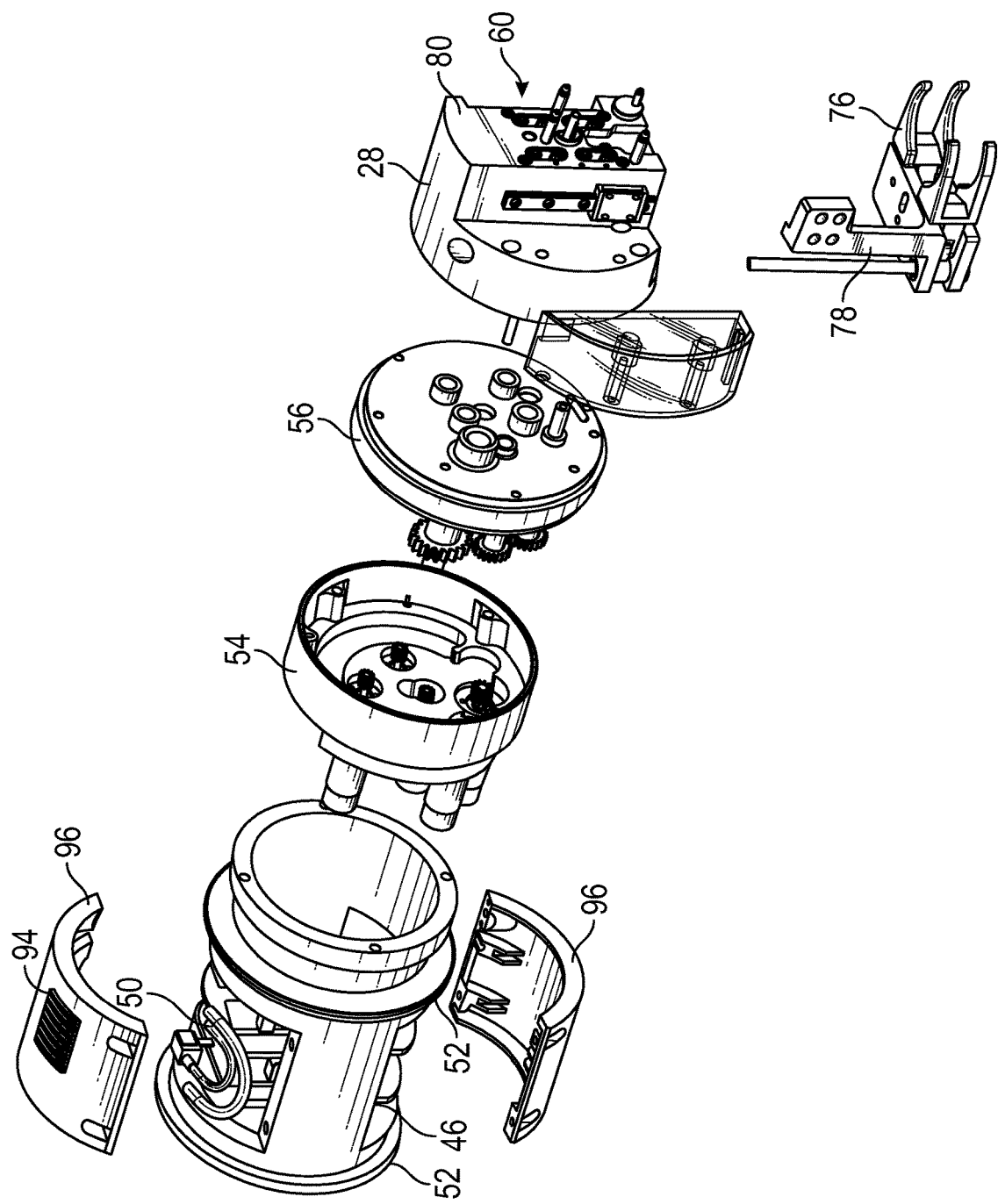
FIG. 5 illustrates an exploded view of the pump drive mechanism of FIG. 4 in accordance with aspects of the present disclosure.

The pump drive mechanism 20 is illustrated in FIG. 4, and in an exploded view in FIG. 5, according to an embodiment. In the embodiment shown in FIGS. 4 and 5, the pump drive mechanism 20 comprises a multitude of sections. At one end of the pump drive mechanism 20 is the rotation housing 46, which holds the drive electronics and includes locking flanges 94 on its housing 96 for flexible tubing 50 which may run from one or more diluent containers and/or waste containers to one or more corresponding manifolds. The rotation housing 46 is capable of rotating around its axis to rotate the rest of the pump drive mechanism 20. The rotation housing 46 includes bearing ribs 52 on its ends which allow it to rotate. For example, the pump drive mechanism may be configured to rotate through any suitable angle such as up to and including 180°, or more than 180°.

Figure 6:
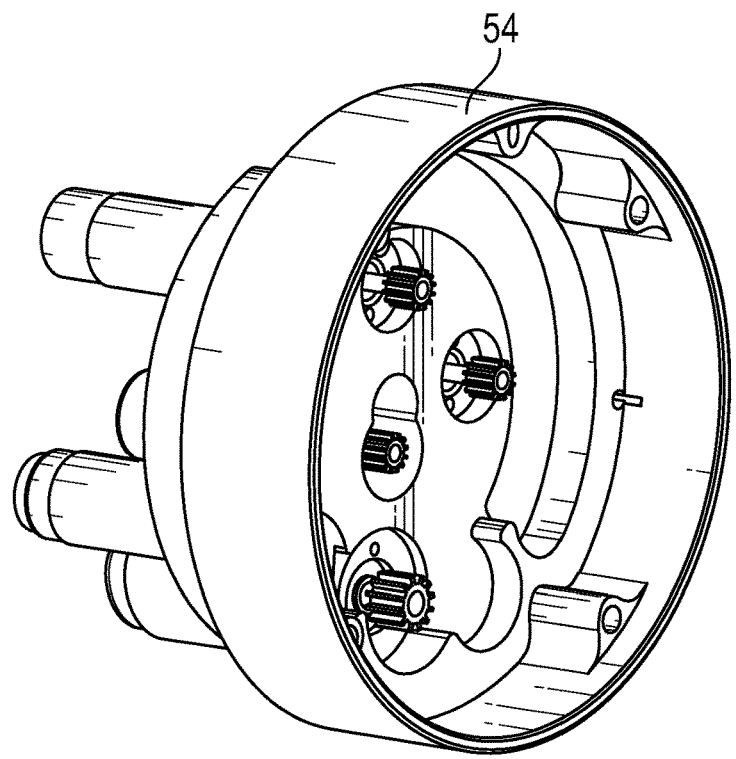
FIG. 6 illustrates a perspective view of an example of an exemplary embodiment of a motor mount in accordance with aspects of the present disclosure.
Figure 7:
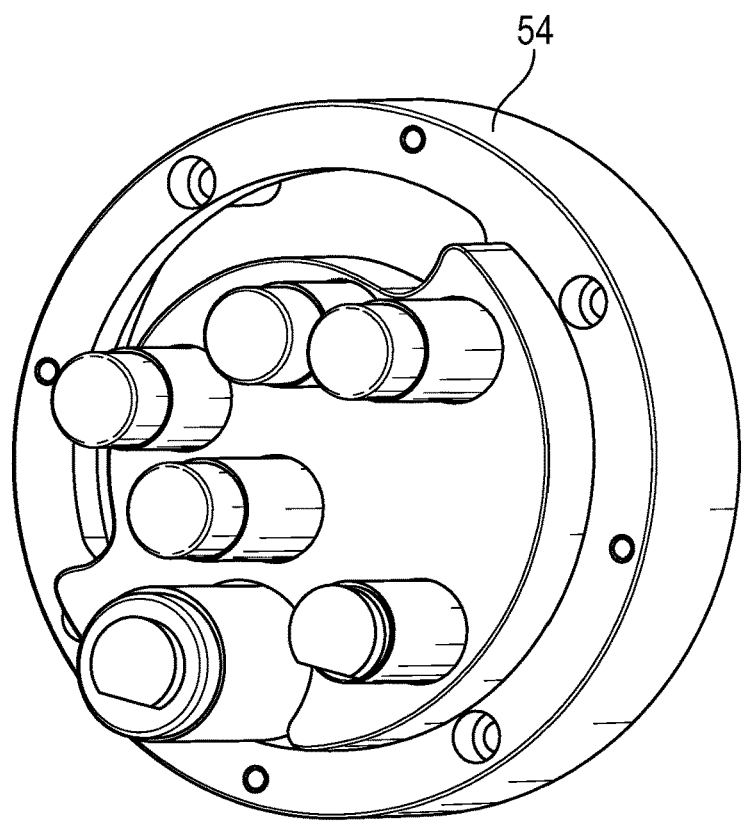
FIG. 7 illustrates a rear perspective view of the motor mount of FIG. 6 in accordance with aspects of the present disclosure.
Figure 8:
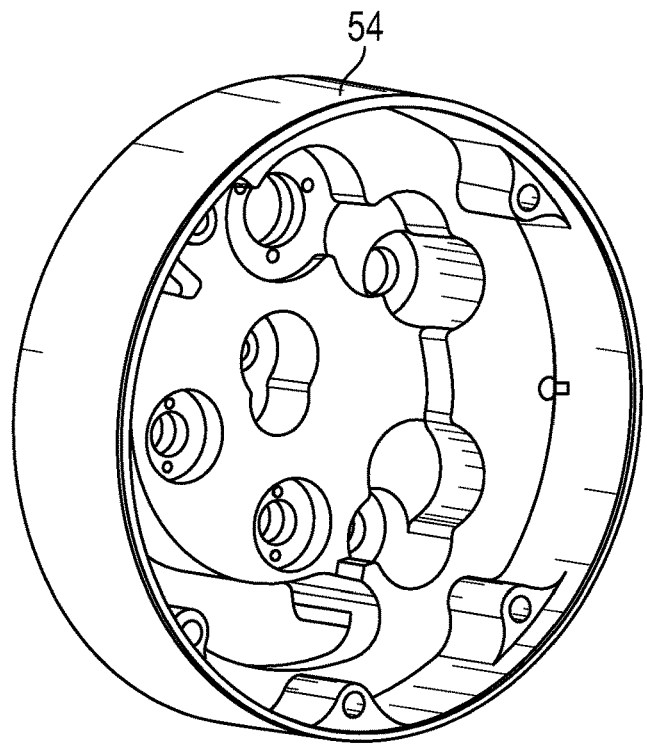
FIG. 8 illustrates a perspective view of the motor mount of FIG. 6 in accordance with aspects of the present disclosure.
Figure 9:
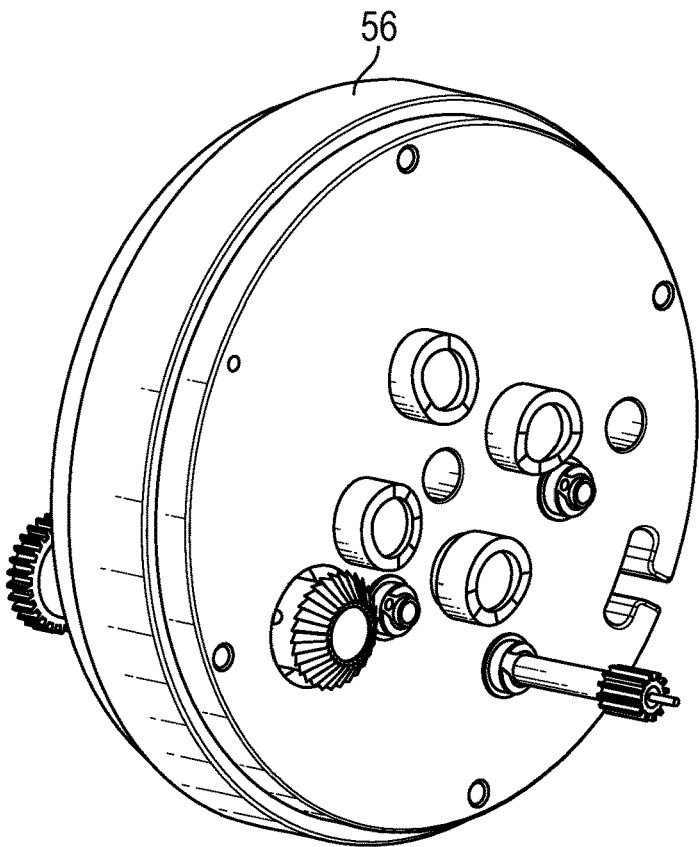
FIG. 9 illustrates a perspective view of an exemplary embodiment of a cam housing in accordance with aspects of the present disclosure.
Figure 10:
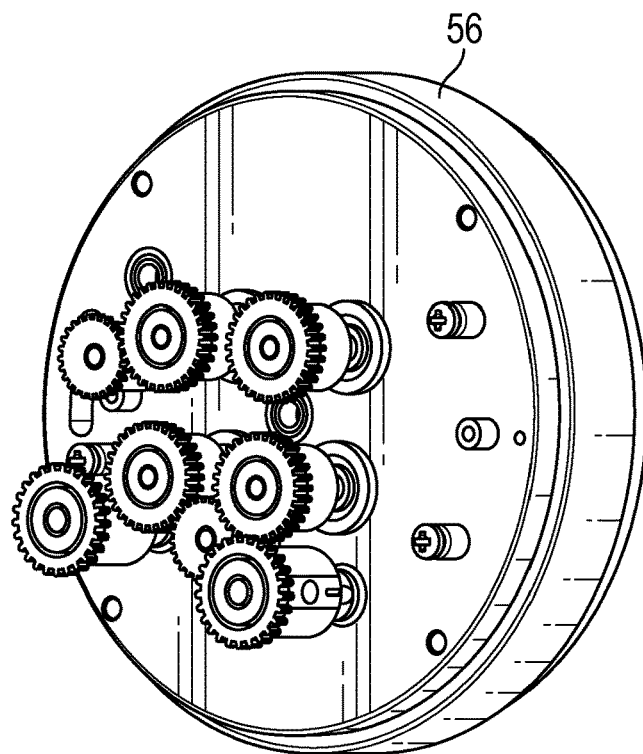
FIG. 10 illustrates a rear perspective view of the cam housing of FIG. 9 in accordance with aspects of the present disclosure.
Figure 11:
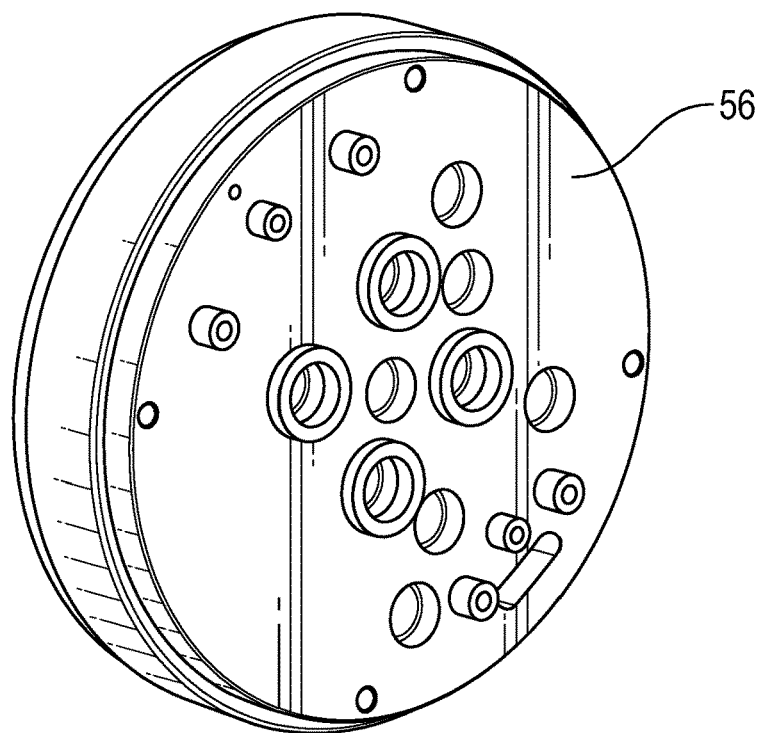
FIG. 11 illustrates a rear perspective view of the cam housing of FIG. 9 with the gears removed in accordance with aspects of the present disclosure.
Figure 12:
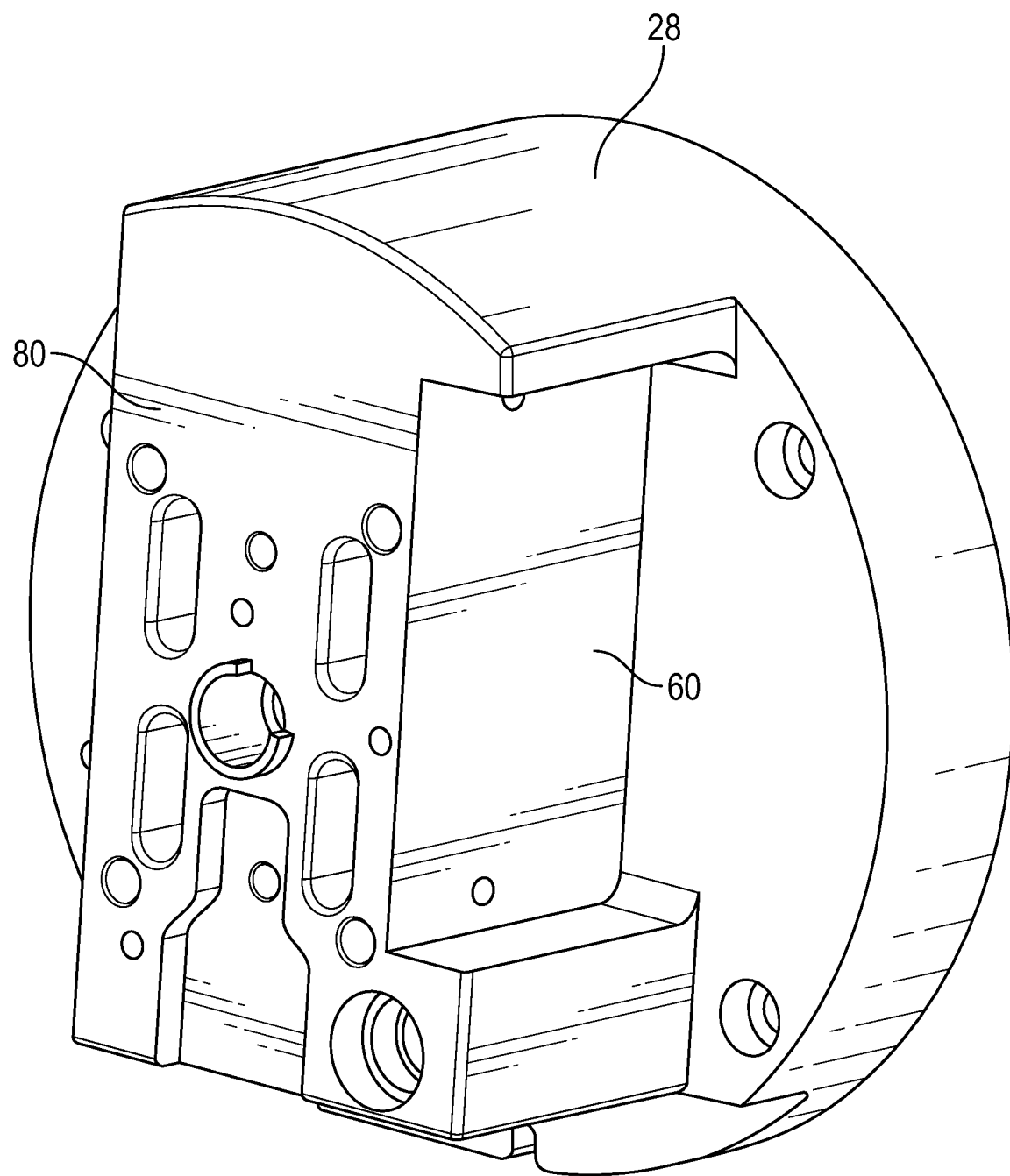
FIG. 12 illustrates a perspective view of an exemplary embodiment of a pump head assembly in accordance with aspects of the present disclosure.
Figure 13:
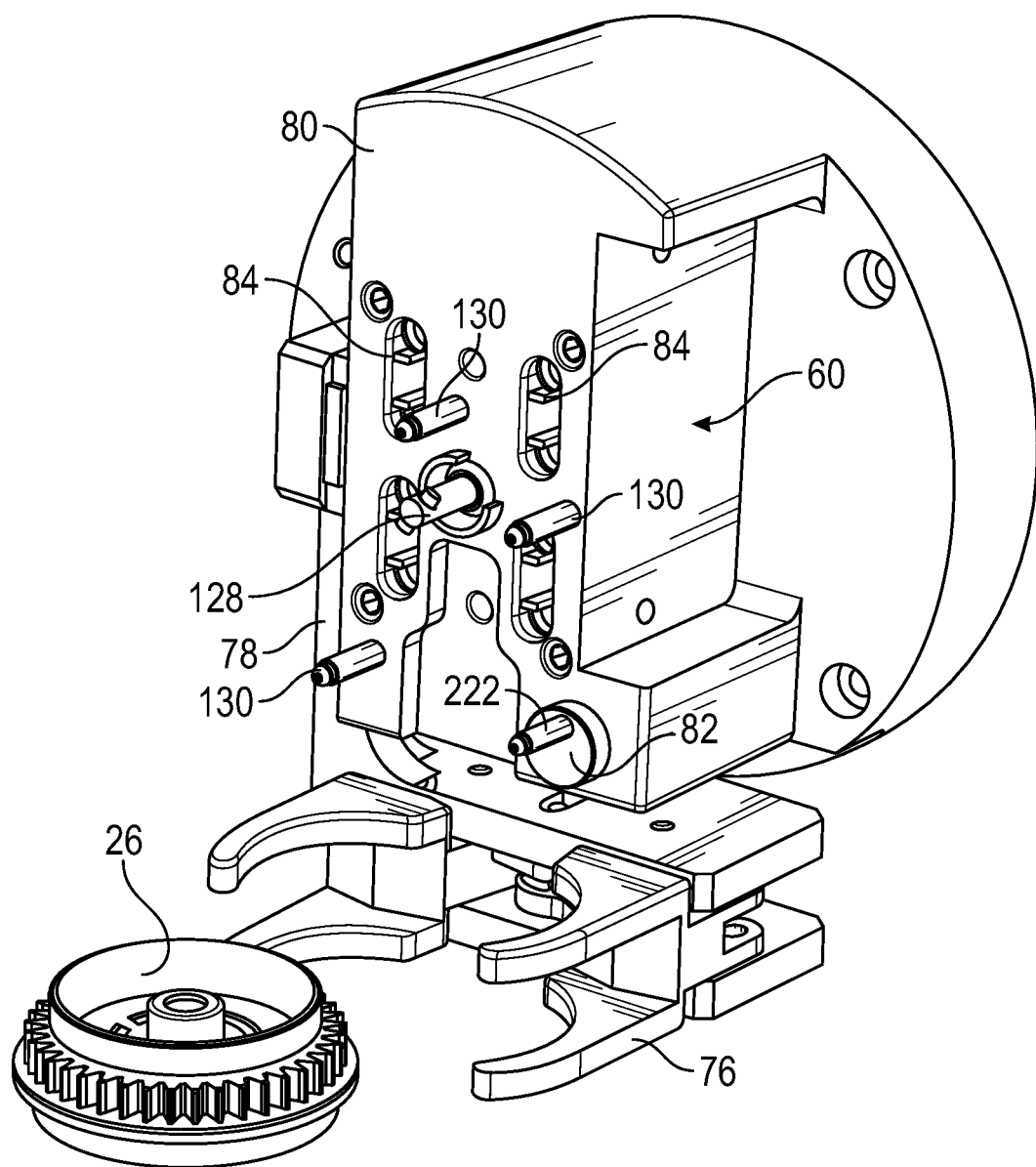
FIG. 13 illustrates a perspective view of the pump head assembly of FIG. 12 with an exemplary embodiment of a gripping system and vial puck in accordance with aspects of the present disclosure.
Figure 14:
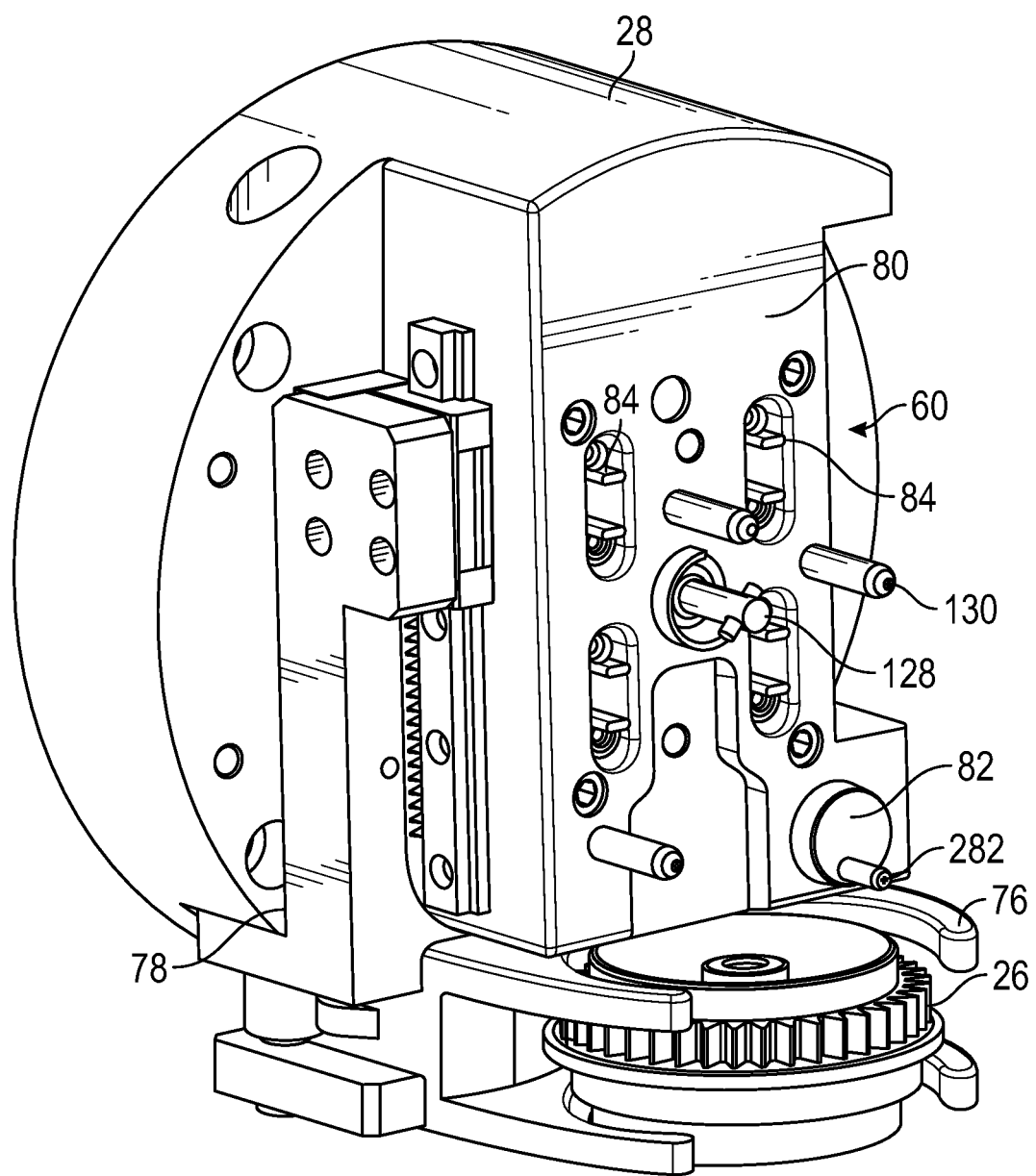
FIG. 14 illustrates a perspective view of the pump head assembly, gripping system and vial puck of FIG. 13 in accordance with aspects of the present disclosure.
Figure 15:
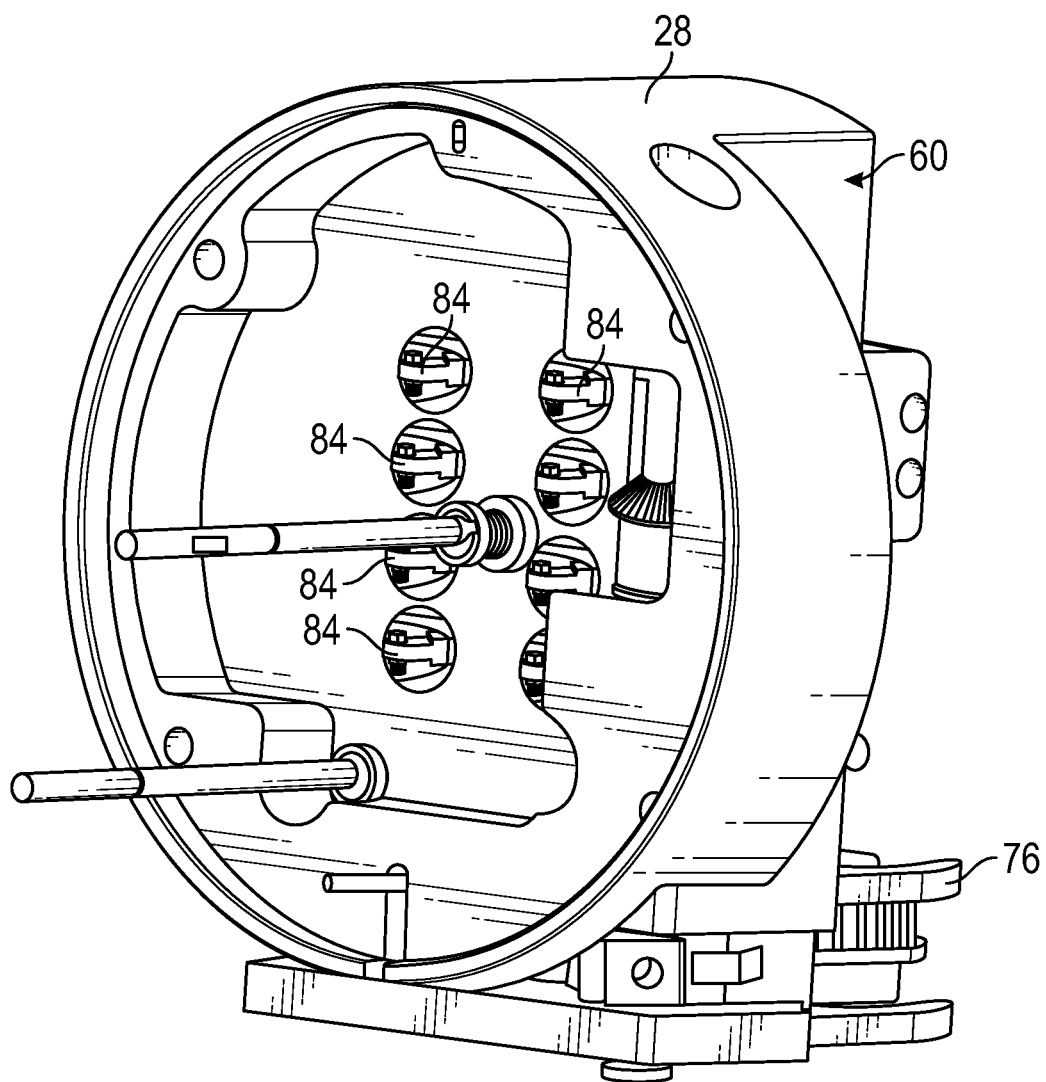
FIG. 15 illustrates a rear perspective view of the pump head assembly, gripping system and vial puck of FIG. 13 in accordance with aspects of the present disclosure.
Figure 16:
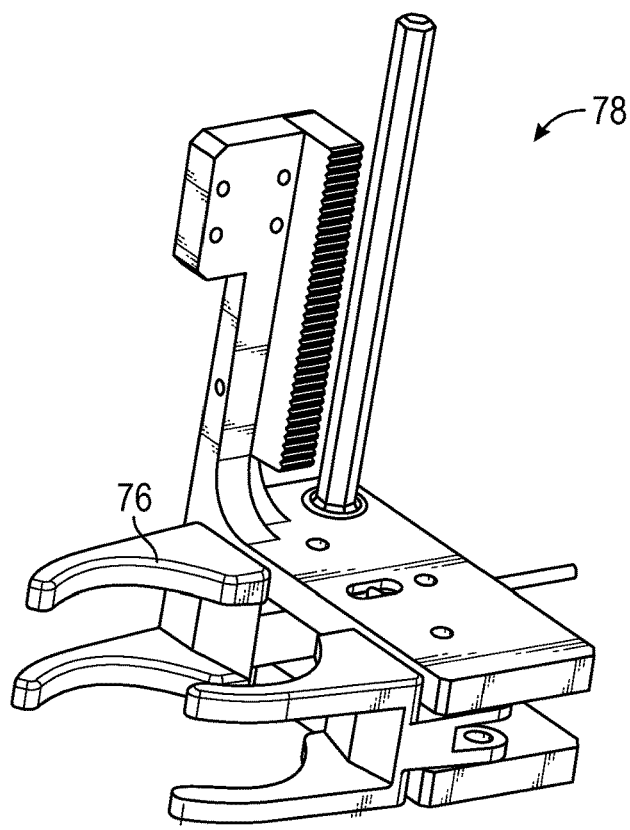
FIG. 16 illustrates a perspective view of an exemplary embodiment of a gripping system in accordance with aspects of the present disclosure.
Figure 17:
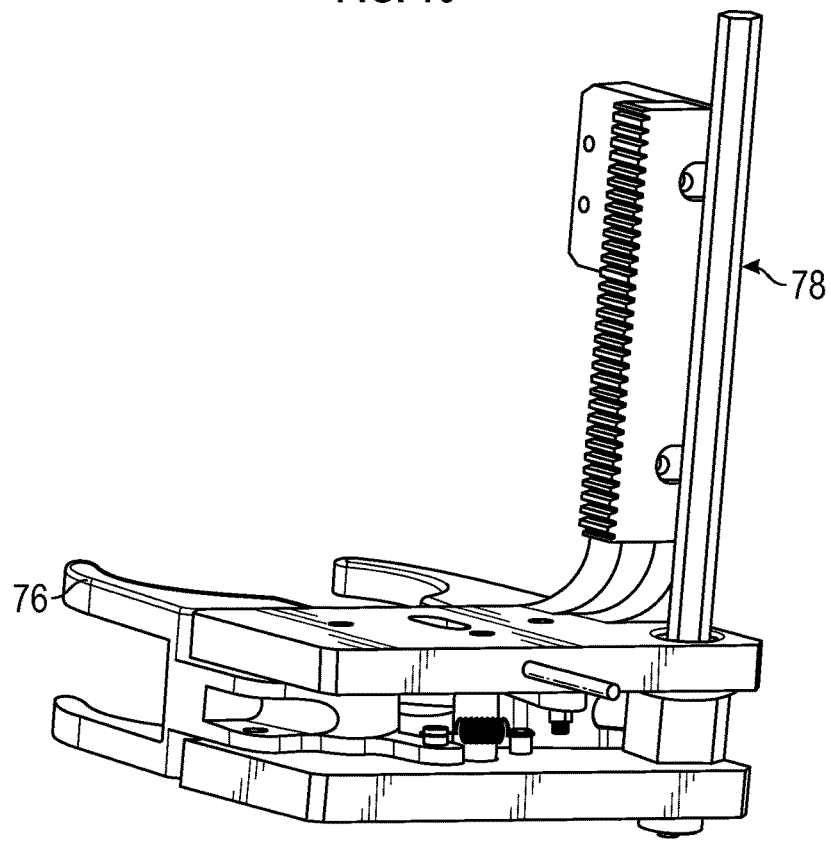
FIG. 17 illustrates a rear perspective view of the gripping system of FIG. 16 in accordance with aspects of the present disclosure.
Figure 18:
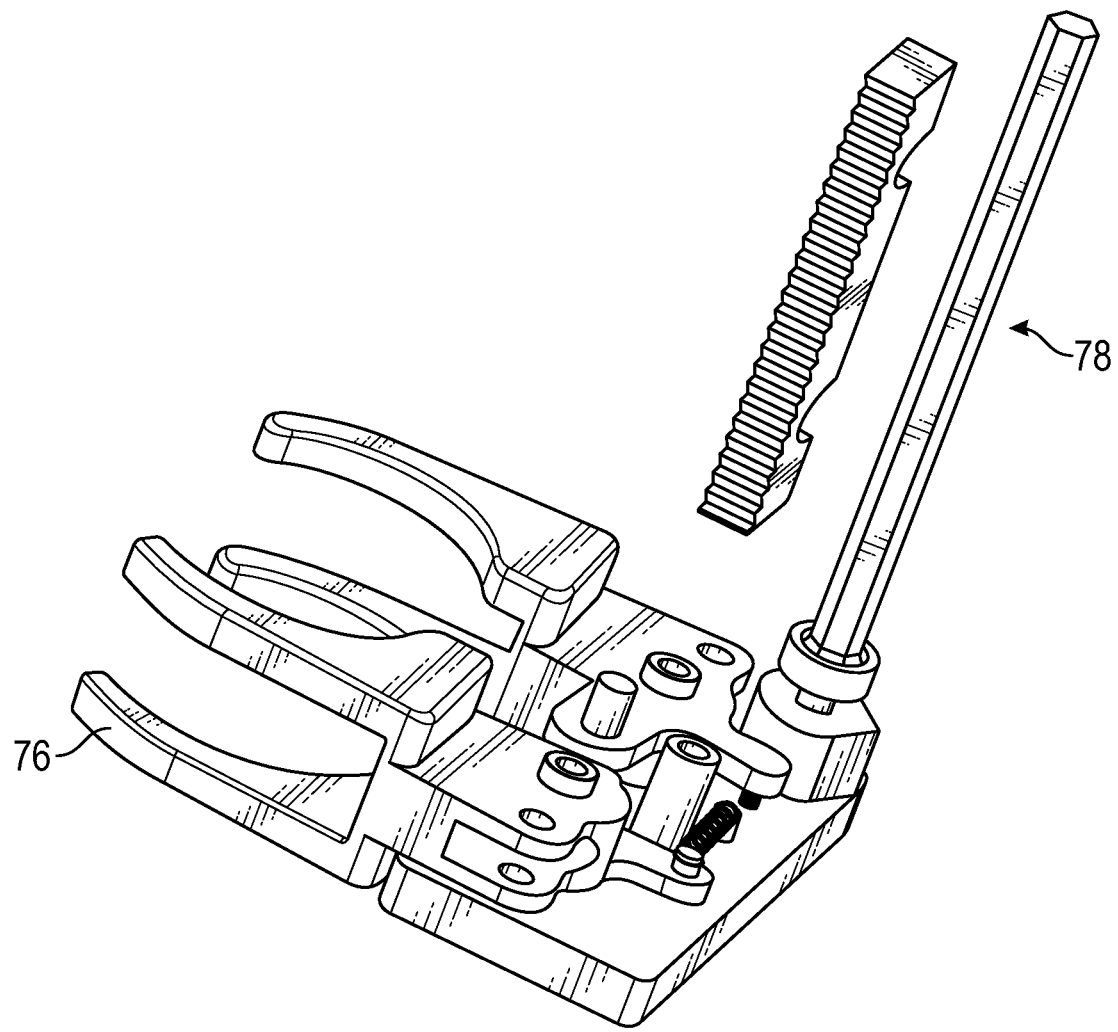
FIG. 18 illustrates a side perspective view of the gripping system of FIG. 16 in accordance with aspects of the present disclosure.
Figure 19:
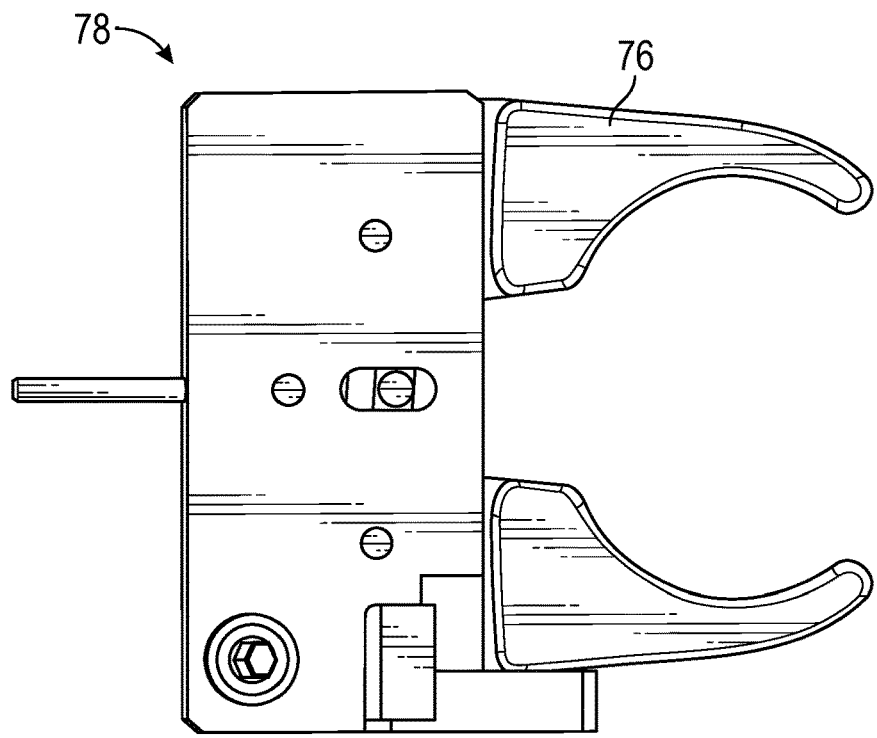
FIG. 19 illustrates a top plan view of the gripping system of FIG. 16 in accordance with aspects of the present disclosure.
Figure 20:
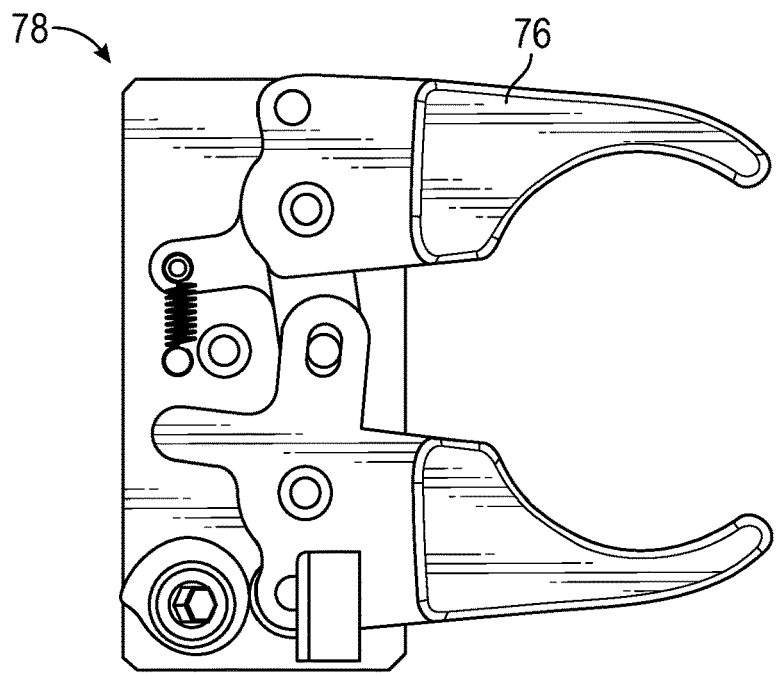
FIG. 20 illustrates a top plan view of the gripping system of FIG. 16 in accordance with aspects of the present disclosure.

Next to the rotation housing 46 is the motor mount 54, which is shown alone from various angles in FIGS. 6-8, according to an embodiment. In the embodiment shown in FIGS. 4-8, the cam housing 56, shown in further details from various angles FIGS. 9-11, is connected to the motor mount 54, which includes cams and gears that control the rotary motion of the motors and the axial motion of the pump drive mechanism 20 as it moves into position to pick up a cartridge 16 and a vial 18.

The compounder system also includes a diluent magazine (not shown) that mounts in a slot 60 located on the side of the pump drive mechanism. The diluent magazine may be a disposable piece configured to receive any number of individual diluent manifolds operable as diluent ports. The diluent manifolds (not shown) may be modular so they can easily and removably connect to each other, the magazine, and/or connect to the pump drive mechanism 20.

The final portion of the pump drive mechanism 20 is the pump head assembly 28. The pump head assembly 28 includes the vial grasping arms 76, the vial lift 78, the pump cartridge grasp 80, the pump piston eccentric drive shaft 82 with arm 222, the valve actuation mechanisms 84, as well as the motors that allow the pump drive mechanism 20 to move forward and back and to rotate in order to mix the pharmaceutical in the vial 18 once the diluent has been added to it. The compounder 10 may also include an input screen 86 such as a touch screen 86 as shown in the figures to provide data entry by the user and notifications, instructions, and feedback to the user.

Figure 21:
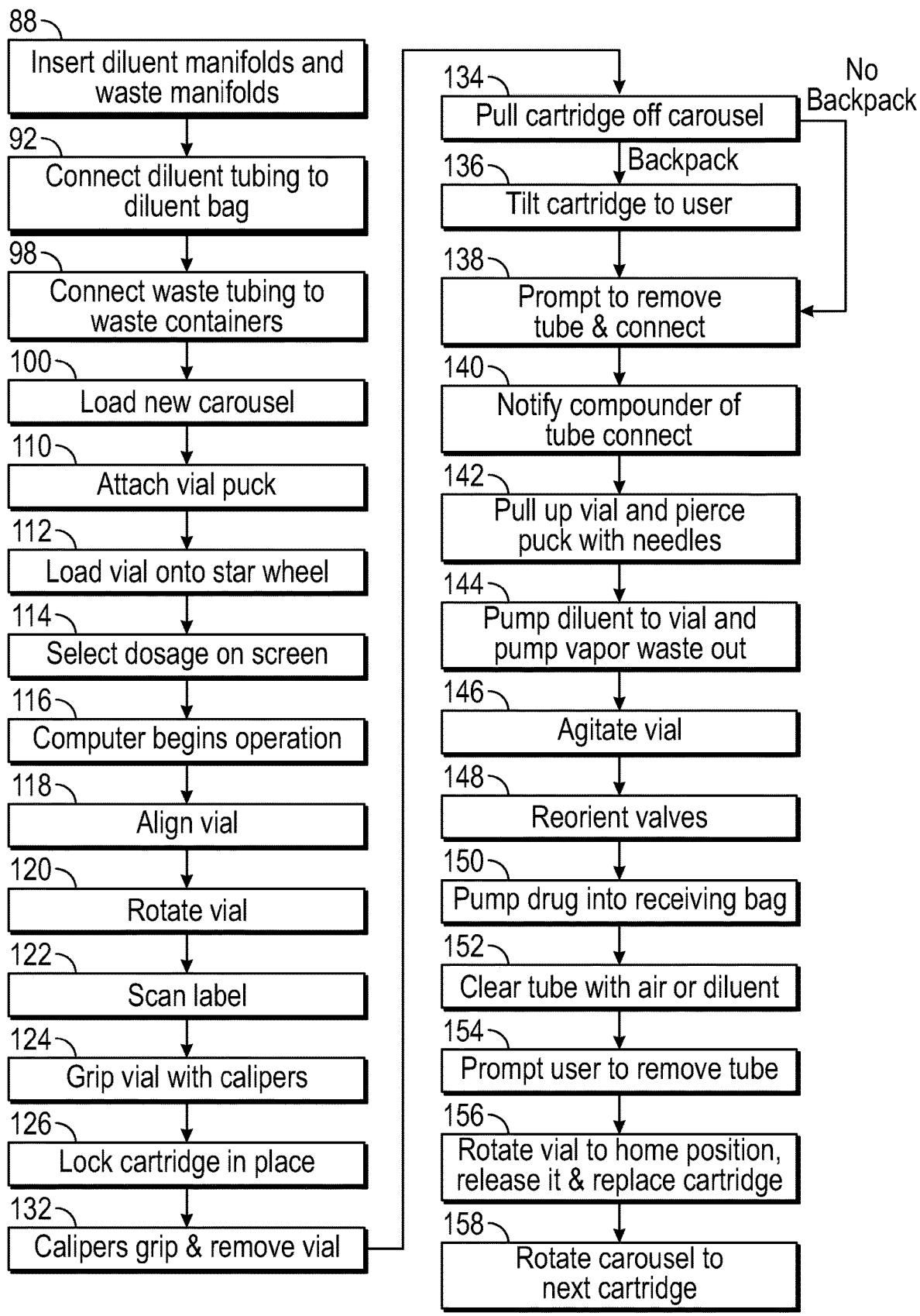
FIG. 21 is a flow chart illustrating an exemplary embodiment of the steps of a process in accordance with aspects of the present disclosure.

The operation of the compounder system 10 will now be generally described in the flowchart illustrated at FIG. 21, according to an embodiment. In the first step 88, a user inserts a new diluent manifold magazine having a plurality of manifolds (e.g., diluent manifolds and waste manifolds) into the slot 60 on the side of the pump head assembly 28. Manifolds may be loaded into the magazine before or after installing the magazine in the slot 60. The manifolds maintain needles inside the housing of the manifold until the cartridge 16 is later locked in place. The magazine may contain any number of diluent manifolds and vapor waste manifolds. In one illustrative system, there may be three diluent manifolds and one vapor waste manifold. In the next step 92, diluent tubing is connected to corresponding diluent bags. The tubes may be routed through locking flanges on a surface (e.g., the front surface) of the compounder frame to hold them in place. For example, in the illustrated embodiment of FIG. 24, the tubes are held in place with locking flanges 2402 on the frame of the compounder. Alternatively, other types of clips or locking mechanisms known in the art may be used to hold the tubes securely in place. In the illustrated embodiment of FIG. 4, the additional flanges 94 positioned on the outside housing 96 of the pump drive mechanism 20 are provided for securing internal wiring of the compounder. In the next step 98, waste tubing may be connected to the vapor waste bag 44. In other embodiments, tubing may be pre-coupled between the manifolds and associated containers such as diluent containers and/or waste containers and the operations of steps 92 and 98 may be omitted.

If desired, in the next step 100, a new carousel 14 may be loaded into a carousel mounting station such as a carousel hub of the compounder system. The carousel 14 may contain any number of disposable cartridges 16 arranged in a generally circular array. In the next step 110, a vial puck 26 is attached to the top of a vial 18 of a powdered or liquid pharmaceutical for reconstitution and the vial 18 is loaded into the star wheel 22 under the carousel 14 in the next step 112. Step 110 may include loading multiple vials 18 into multiple vial puck recesses in star wheel 22. After one or more vials are loaded into the star wheel, the vials are rotated into position to enable and initiate scanning of the vial label of each vial. In one embodiment, the user will be allowed to load vials into the star wheel until all vial slots are occupied with vials before the scanning is initiated. A sensor may be provided that detects the loading of each vial after which a next vial puck recess is rotated into the loading position for the user. Allowing the user to load all vials into the star wheel prior to scanning of the vial labels helps increase the efficiency of compounding. However, in other implementations, scanning of vial labels may be performed after each vial is loaded or after a subset of vials is loaded. Following these setup steps, the next step 114 is for a user to select the appropriate dosage on the input screen.

After the selection on the input screen 86, the compounder 10 begins operation 116. The star wheel 22 rotates the vial into alignment 118 with the vial grasping calipers 76 of the pump head assembly 28. The vial puck 26 includes, for example, gears that interface with gears coupled to a rotational motor that allow the vial 18 to rotate 120 so that a scanner (e.g., a bar code scanner or one or more cameras) can scan 122 a label on the vial 18. The scanner or camera (and associated processing circuitry) may determine a lot number and an expiration date for the vial. The lot number and expiration date may be compared with other information such as the current date, recall or other instructions associated with the lot number, compounder operators such as pharmacy technicians (techs), inventory levels for that lot number, etc. In this way, the lot number and/or expiration date from an imaged label can be used to support activities, such as productivity reporting. For example, the pharmacist can keyword search a particular lot number and see which pharmacy techs have the most experience handling this particular type of drug. As another example, a pharmacist can search the hospital/pharmacy inventory database and determine an inventory level of drugs associated with this lot number and expiration date.

Once the vial 18 is scanned and aligned, in the next step 124 the pump drive mechanism 20 moves forward into position to grip the vial 18 with the calipers 76. The forward movement also brings the mounting posts 130 and locking bayonet 128 on the front of the pump head assembly 28 into matching alignment with corresponding openings on a cartridge 16. In the next step 126 the cartridge 16 is locked in place on the pump head assembly 28 with the locking bayonet 128 and the calipers 76 grip 132 the vial puck 26 on the top of the vial 18. The calipers 76 then remove 132 the vial 18 from the star wheel 22 by moving backward, while at the same time pulling 134 the cartridge 16 off of the carousel 14.

In some embodiments, the cartridge 16 includes a backpack that includes a coiled tube. In this embodiment, in step 136 the pump drive mechanism 20 tilts the cartridge 16 toward the user to expose the end of the tube and prompts 138 the user to pull the tube out of the backpack and connect it to the receiving bag 32. In an alternative embodiment, the tube 38 is exposed on the side of the carousel 14 once the cartridge 16 is pulled away from the carousel 14. In another alternative embodiment, the tube 38 is automatically pushed out (e.g., out of the backpack) thus allowing the user to grab onto the connector located at the end of the tube and connect to the receiving container. The system prompts 138 the user to pull the tube out from the carousel 14 and connect it to the input 34 of the IV bag 32. Once the tube 38 is connected, in step 140 the user may notify the compounder 10 to continue the compounding process by interacting with the input screen 86.

At step 142, the vial 18 is pulled up towards the cartridge 16 so that one or more needles such as a coaxial dual lumen needle of the cartridge 16 pierce the top of the vial puck 26 and enter the interior of the vial 18. Although the example of FIG. 21 shows engagement of the needle with the vial puck after the user attaches the tube from the cartridge to the receiving container, this is merely illustrative. In another embodiment, steps 138 and 140 may be performed after step 142 such that engagement of the needle with the vial puck occurs before the user attaches the tube from the cartridge to the receiving container.

Diluent is pumped 144 into the vial 18 through the cartridge 16 and a first needle in the proper dosage. If necessary, a second or third diluent may be added to the vial 18 via a second or third diluent manifold attached to the cartridge 16. Simultaneously, vapor waste is pumped 144 out of the vial 18, through a second needle, through the cartridge 16 and the vapor waste manifold, and into the vapor waste bag 44. The valve actuators 84 on the pump head assembly 28 open and close the valves of the cartridge 16 in order to change the fluid flow paths as necessary during the process. Once the diluent is pumped into the vial 18, the pump drive mechanism 20 agitates the vial 18 in the next step 146 by rotating the vial lift 78 up to, for example 180 degrees such that the vial 18 is rotated between right-side-up and upside-down positions. The agitation process may be repeated for as long as necessary, depending on the type of pharmaceutical that is being reconstituted. Moreover, different agitation patterns may be used depending on the type of drugs being reconstituted. For example, for some drugs, rather than rotating by 180 degrees, a combination of forward-backward, and left-right motion of the pump head may be performed to generate a swirling agitation of the vial. A plurality of default agitation patterns for specific drugs or other medical fluids may be included in the drug library stored in (and/or accessible by) the compounder control circuitry. Once the agitation step is complete, the pump drive mechanism rotates the vial to an upside down position or other suitable position and holds it in place. In some embodiments, a fluid such as a diluent already in the receiving container 32 may be pumped (e.g., through the cartridge or via a separate path) into a liquid waste container to allow room in the receiving container for receiving the reconstituted medicine.

In the next step 148, the valve actuators 84 reorient the valves of the cartridge and the pumping mechanism of the cartridge 16 is activated to pump 150 the reconstituted drug into the receiving bag 32 through the attached tube. Once the drug is pumped into the receiving bag 32, in the next step 152 the pump drive mechanism 20 clears the tube 38 by either pumping filtered air or more diluent through the tube 38 into the receiving bag 32 after another valve adjustment to ensure that all of the reconstituted drug is provided to the receiving bag 32. In some scenarios, a syringe may be used as a receiving container 32. In scenarios in which a syringe is used as the receiving container 32, following delivery of the reconstituted drug to the syringe, a vacuum may be generated in tube 38 by pump drive mechanism 20 to remove any air or other vapors that may have been pushed into the syringe so that, when the syringe is removed from tube 38, the reconstituted drug is read for delivery to a patient and no air or other unwanted gasses are present in the syringe.

The system then prompts 154 the user to remove the tube 38 from the receiving container 32. The user may then insert the connector (e.g., a Texium® or SmartSite® connector) into its slot in the backpack or carousel and an optical sensor in the pump head may sense the presence of the connector and automatically retract the tube into either the carousel or the backpack. The tube is pulled back into either the carousel 14 or the backpack, depending on which type of system is in use. In the next step 156, the compounder 10 rotates the vial 18 back into alignment with the star wheel 22 and releases it. The used cartridge 16 may also be replaced on the carousel 14. The used cartridge may be released when a sensor in the pump drive determines that the tube has been replaced in the cartridge (e.g., by sensing the presence of a connector such as a Texium® connector at the end of the tube in the backpack of the cartridge through a window of the cartridge). The carousel 14 and/or star wheel 22 then may rotate 158 to a new unused cartridge 16 and/or a new unused vial 18 and the process may be replicated for a new drug. In some circumstances (e.g., multiple reconstitutions of the same drug), a single cartridge may be used more than once with more than one vial.

The cartridges 16 are designed to be disposable, allowing a user to utilize all the cartridges 16 in a given carousel 14 before replacing the carousel 14. After a cartridge 16 is used, the carousel 14 rotates to the next cartridge 15, and the system software updates to note that the cartridge 16 has been used, thus preventing cross-contamination from other reconstituted drugs. Each cartridge 16 is designed to contain all the necessary flow paths, valves, filters and pumps to reconstitute a drug with multiple diluents if necessary, pump the reconstituted drug into the receiving container, pump vapor waste out of the system into a waste container, and perform a final QS step in order to make sure that the proper amount of drug and diluent is present in the receiving container. This complete package is made possible by the specific and unique construction of the cartridge 16, its flow paths, and its valve construction.

Figure 22:
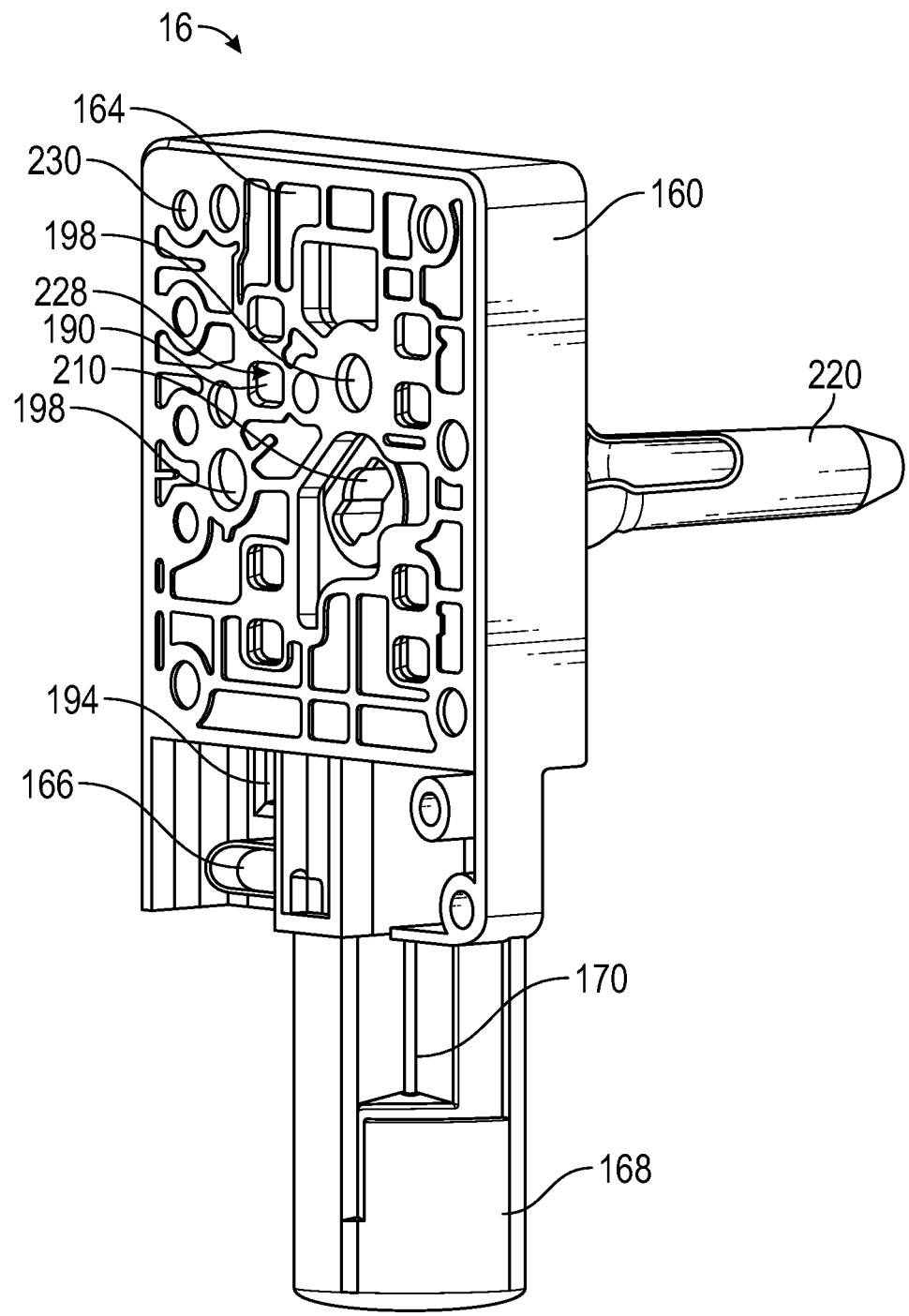
FIG. 22 illustrates a perspective view of an exemplary embodiment of a cartridge in accordance with aspects of the present disclosure.

An embodiment of a cartridge 15 is illustrated in FIG. 22. As shown in FIG. 22, cartridge 16 may include a cartridge frame 150, a cartridge bezel 164, as well as a piston pump 166, a needle housing 158 and a needle assembly 170. The cartridge frame 160 provides the main support for each cartridge 16 and includes diluent chambers, a vapor waste chamber, a pumping chamber, a hydrophobic vent, an exit port, and/or other features as described hereinafter that can be connected to a tube that connects to the receiving container 32.

The frame 160 of the cartridge 16 also includes locating features that allow each cartridge 16 to be removably mounted to the pump head assembly 28. These features include, for example, three openings 198 to receive mounting posts 130 from the pump head assembly 28, and a keyhole 210 that allows a locking bayonet 128 to be inserted therein and turned to lock the cartridge 16 to the pump head assembly 28 for removal from the carousel 14. An outlet port extension 220 may be present in some embodiments. The piston pump 166 is mounted within a chamber with a rod 194 positioned within a silicone piston boot. Furthermore, the bezel 164 includes openings 228 in which the valves 190 of the sealing membrane are located and be accessed by the valve actuators 84. Moreover, the bezel 164 includes openings 230 that allow a fluid manifold to be connected to the diluent and vapor waste chambers in the cartridge 16. Bezel 164 may also include an opening that facilitates the detection of a connector (e.g., a Texium® or SmartSite® connector) when the user inserts the connector into the provided slot when compounding is complete. In operation, the needles of the fluid manifold enter through the openings 230 in the bezel 164 and pierce the sealing membrane to gain fluidic access to the diluent and vapor waste chambers defined in the cartridge 16 between the sealing membrane and the cartridge frame 160. Further details of various embodiments of the cartridge 16 will be discussed hereinafter.

Figure 23:
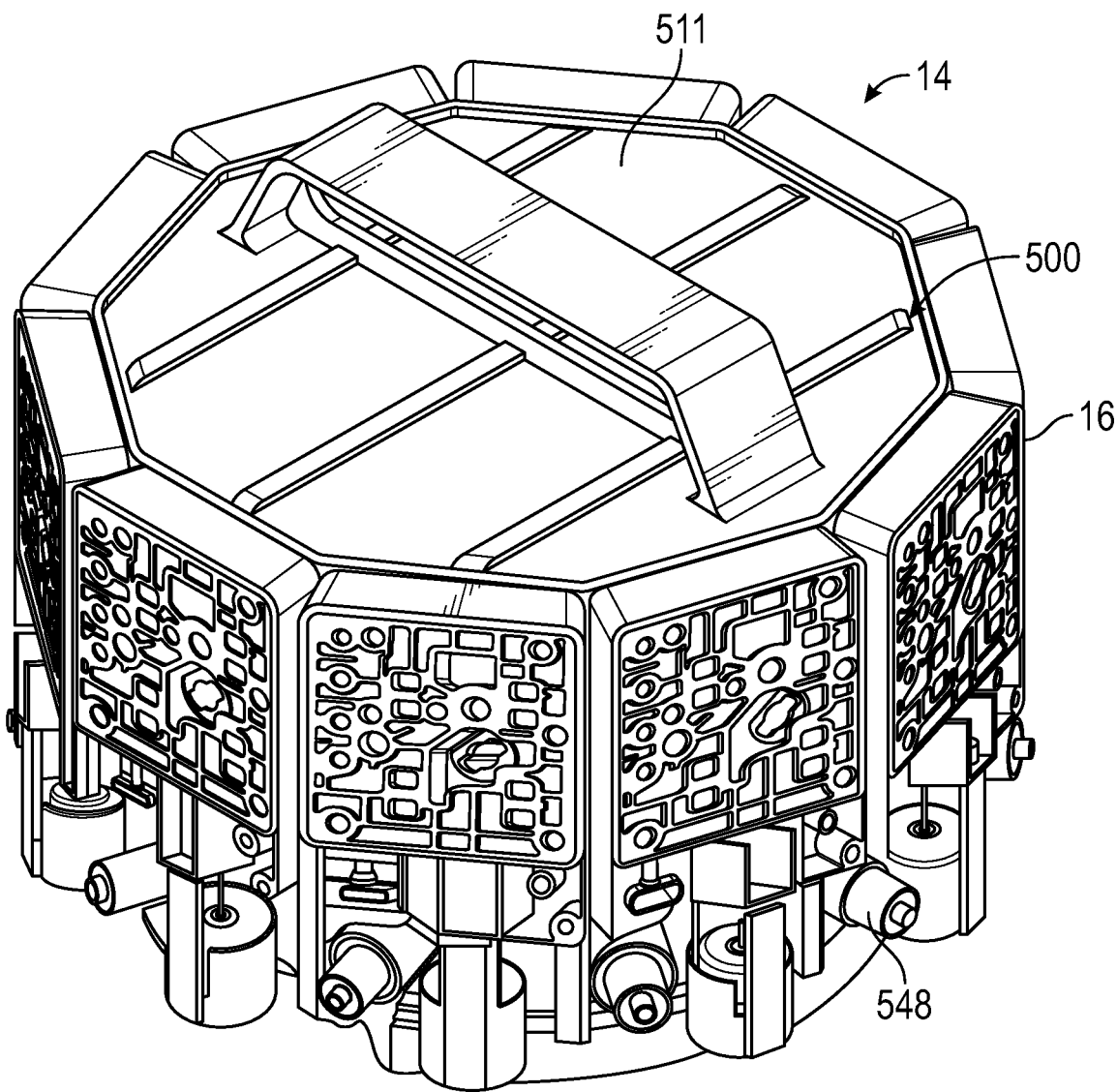
FIG. 23 illustrates a perspective view of an exemplary embodiment of a carousel with a cover in accordance with aspects of the present disclosure.

Referring to FIG. 23, an exemplary embodiment of a carousel 14 removed from the compounder 10 is illustrated, according to an embodiment. The carousel 14 of FIG. 23 includes an array of ten cartridges 16 in this embodiment, but it should be understood that more or fewer cartridges 16 can be present on the carousel 14, leaving some of the carousel 14 pockets 500 empty, or the frame 510 of the carousel can be designed to have more or fewer cartridge pockets 500. The carousel 14 also includes a cover 511 that prevents a user from accessing the tubes coupled to each of the cartridges 16 directly. The cover 511 may be removed if necessary to access the backs of the cartridges 16. In the example implementation of FIG. 23, a connector such as a Texium® attachment 548 is disposed adjacent each cartridge 16, the attachment 548 being attached to the tube 38 that runs from the extension 220 on each cartridge 16.

Figure 24:
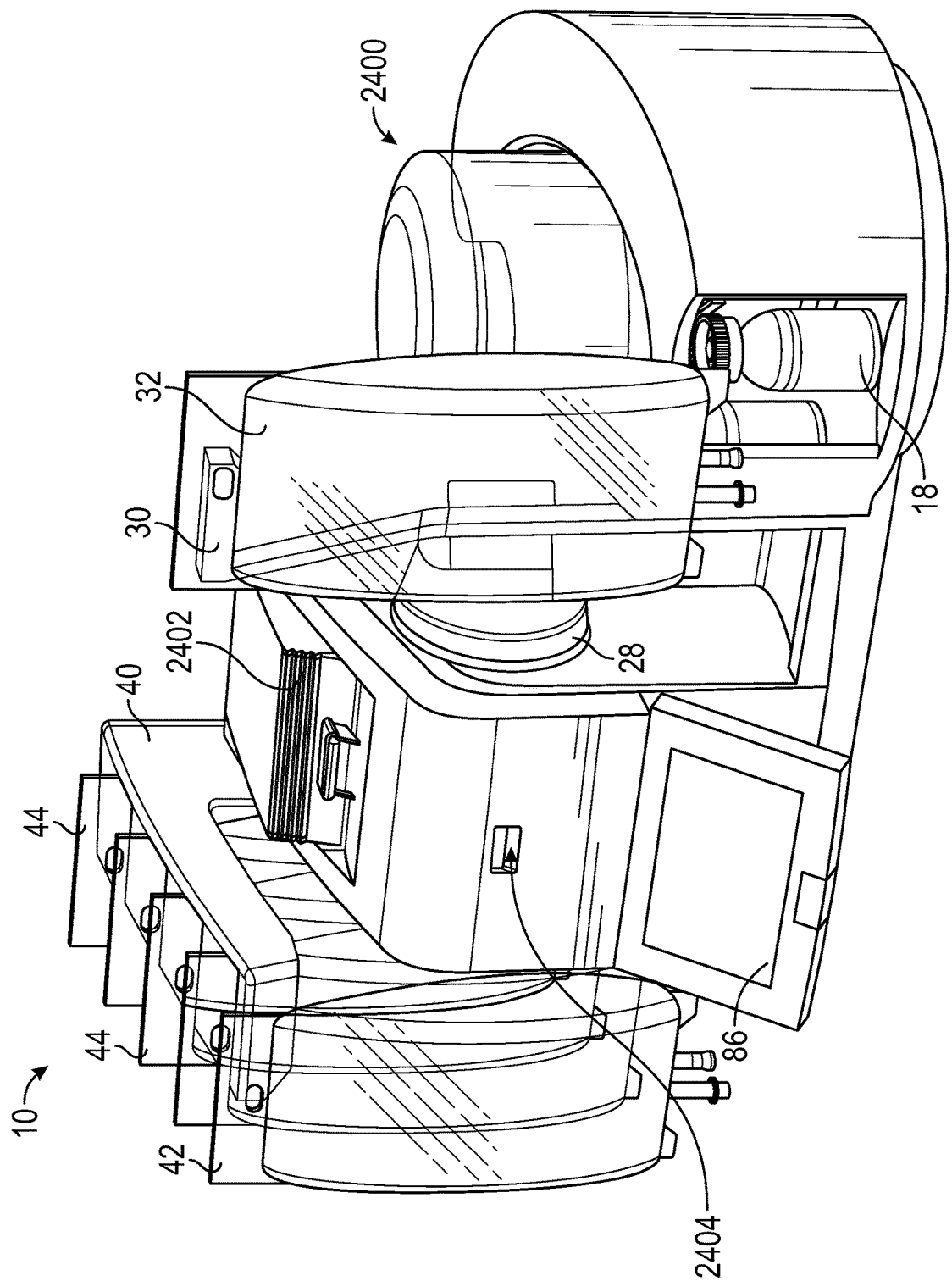
FIG. 24 illustrates a front perspective view of another exemplary embodiment of a compounding system in accordance with aspects of the present disclosure.

FIGS. 24-29 show the compounder 10 according to another embodiment. As shown in FIG. 24, holding apparatus 40 may be implemented as an extended arm providing support for mounting devices for each of containers 42 and 44. Holding apparatus 40 and holding apparatus 30 may each include one or more sensors such as weight sensors configured to provide weight measurements for determining whether an appropriate amount of fluid has been added to or removed from a container or to confirm that fluid is being transferred to and/or from the appropriate container (e.g., that the appropriate diluent is being dispensed). A scanner 2404 may be provided with which each diluent container and/or the receiving container can be scanned before and/or after attachment to compounder 10. As shown in FIG. 24, a carousel cover 2400 and tube management structures 2402 may also be provided on compounder 10 in various embodiments. For example, tubes connected between containers 42 and/or 44 and corresponding manifolds can each be mounted in a groove of tube management structure 2402 to prevent tangling or catching of the tubes during operation of compounder 10.

Figure 25:
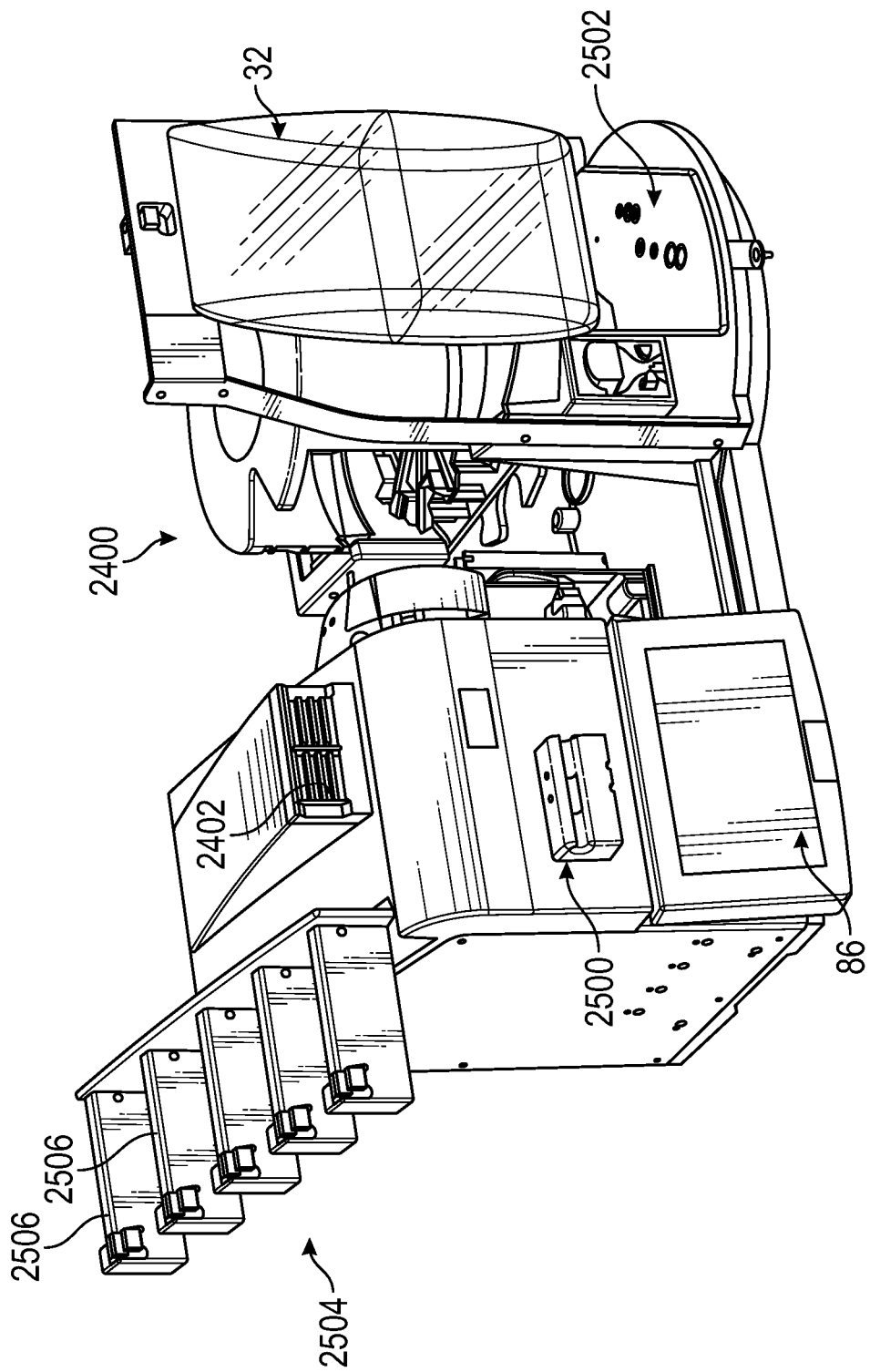
FIG. 25 illustrates another front perspective view of the compounding system of FIG. 24 in accordance with aspects of the present disclosure.

As shown in FIG. 25, an opening 2502 may be provided by which vials 18 can be installed in the star wheel. Additionally, an exterior pump 2500 may be provided for pumping non-toxic liquid waste from, for example, receiving container 32 to a waste container 44 (e.g., for pumping a desired amount of saline out of receiving container 32 quickly and without passing the liquid waste through a cartridge and/or other portions of the compounder).

A fluidics module 2504 may be provided that includes several container mounts 2506. Container mounts 2506 may be used for hanging diluent and waste containers and may include sensor circuitry for sensing when a container has been hung and/or sensing the weight of the container. In this way, the operation of compounder 10 can be monitored to ensure that the correct diluent contain has been scanned and hung in the correct location and that the waste is being provided in an expected amount to the appropriate waste container.

Figure 26:
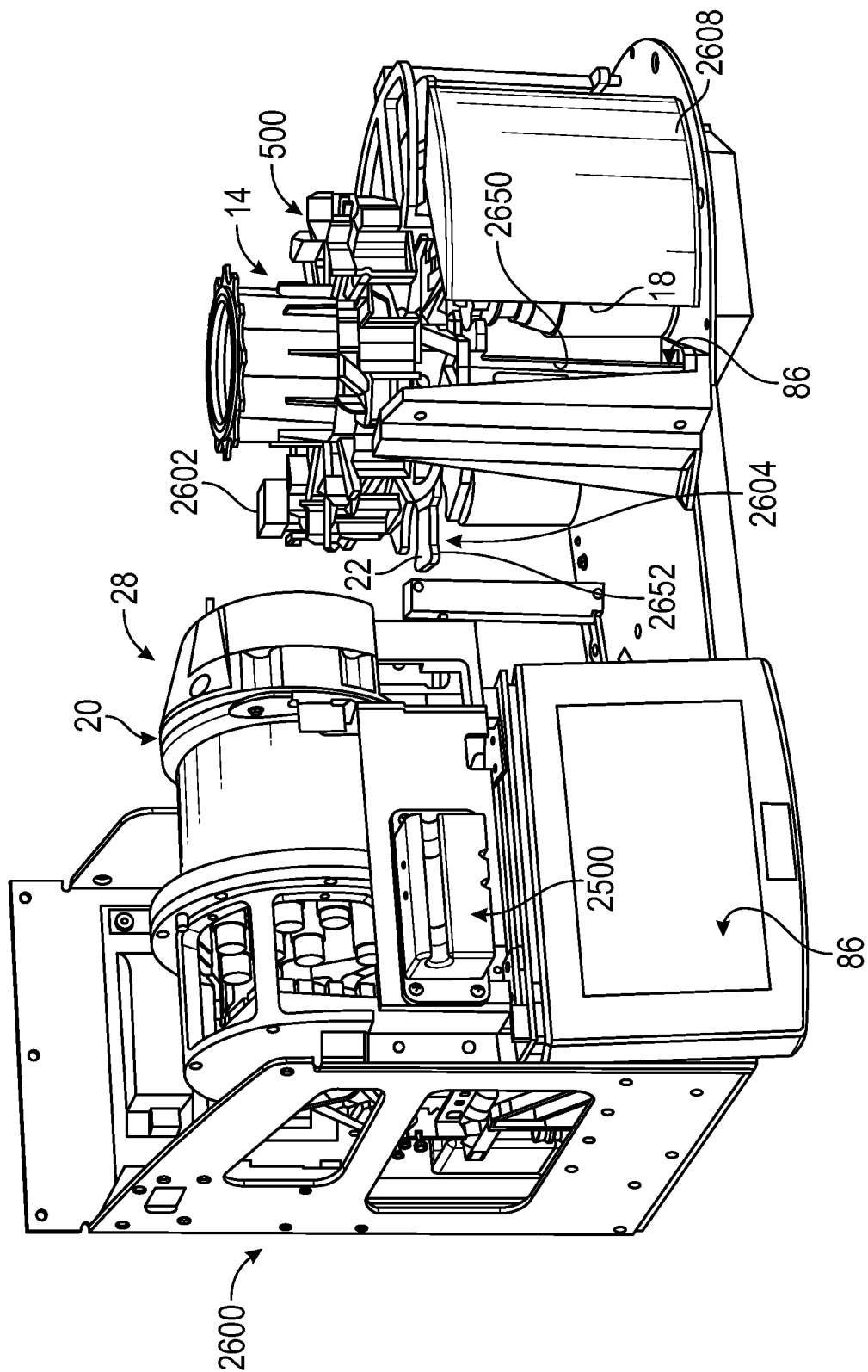
FIG. 26 illustrates a front perspective view of the compounding system of FIG. 24 with portions of the housing removed in accordance with aspects of the present disclosure.

As shown in FIG. 26, pump 2500 and display 86 may be mounted to a chassis 2600. Pump drive 20 may be mounted partially within the chassis 2600 with pump head assembly 28 extending from the chassis to a position which allows the pump head assembly to rotate (e.g., to turn over or agitate a vial). Carousel 14 is also shown in FIG. 26 without any cartridges mounted therein so that cartridge mounting recesses 500 can be seen.

Star wheel 22 (sometimes referred to herein as a vial tray) is shown in FIG. 26 with several empty vial puck recesses 2604. Vial tray 22 may be rotated and an actuating door 2608 may be opened to facilitate loading of vials 18 into the vial puck recesses 2604 in vial tray 22. In some embodiments, door 2608 may be closed before rotation of vial tray 22 to ensure that the operator's fingers are not in danger of injury from the rotating tray. However, this is merely illustrative. In other embodiments a sensor such as sensor 2650 (e.g., a light curtain) may be provided instead of (or in addition to) door 2608 to sense the presence of an operator in the vicinity of tray 22 and prevent rotation of the tray if the operator or any other obstruction is detected.

Similarly, a lid may be provided for carousel 14 to prevent contamination of cartridges 16 loaded therein, and to prevent injury to an operator due to rotation of the carousel. A lid sensor (not shown) may also be provided to detect the position (e.g., an open position or a closed position) of the lid. Rotation of carousel 14 may be prevented if the lid is not detected in a closed position by the lid sensor.

Each vial 18 that is inserted may be detected using a sensor such as sensor 2652 (e.g., a load sensor or an optical sensor) when placed in a vial puck recess 2604. When detected, the inserted vial may be moved to a scanning position by rotating vial tray 22 and then the inserted vial 18 may be rotated within its position in vial tray 22 using a vial rotation motor 2602 to allow the vial label to be scanned.

Figure 27:
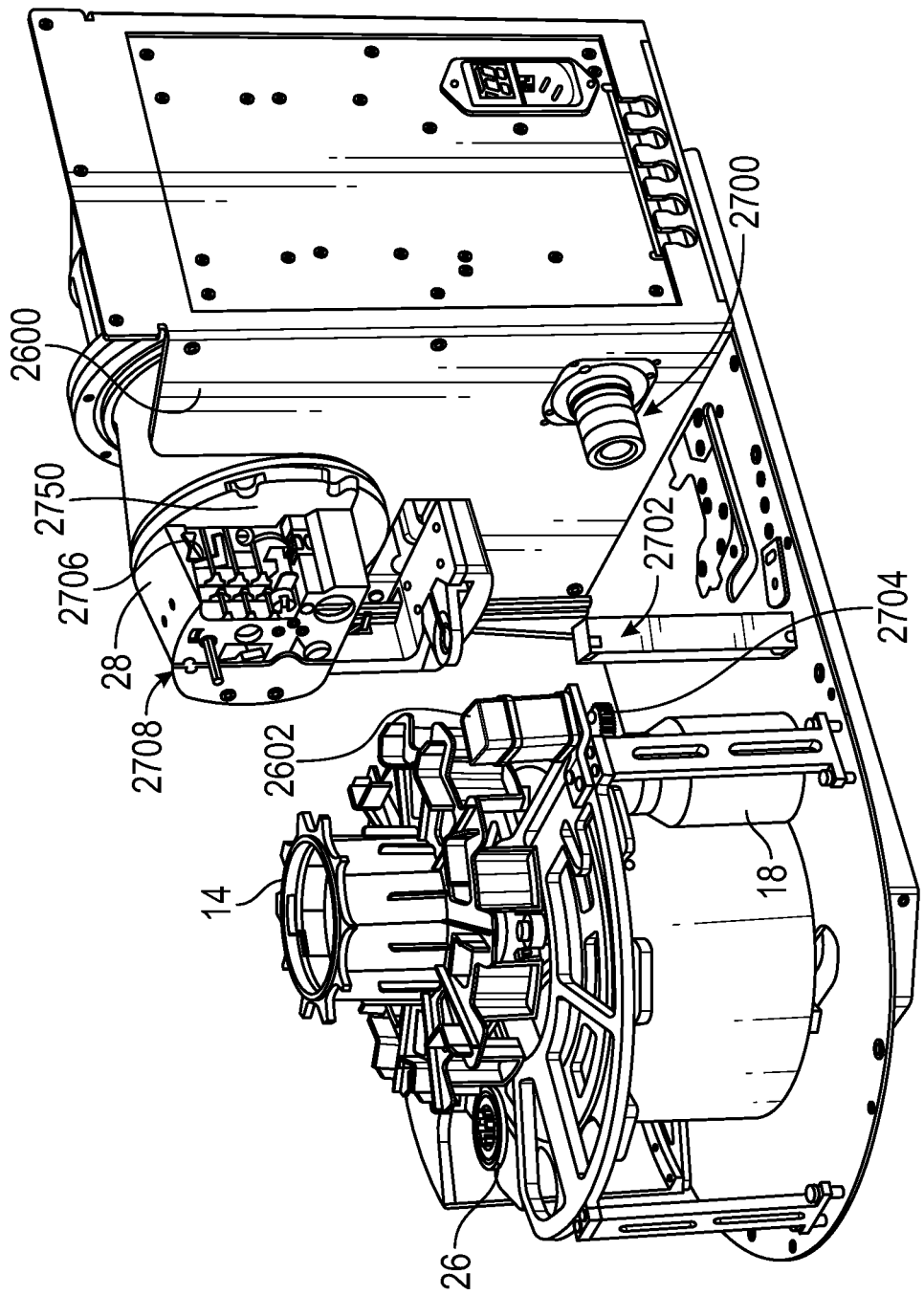
FIG. 27 illustrates a rear perspective view of the compounding system of FIG. 24 with portions of the housing removed in accordance with aspects of the present disclosure.

A reverse perspective view of compounder 10 is shown in FIG. 27 in which scanning components can be seen. In particular, a camera 2700 is mounted in an opening in chassis 2600 and configured to view a vial 18 in a scanning position. Motor 2502 may rotate vial 18 through one or more full rotations so that camera 2700 can capture images of the vial label. In some embodiments, an illumination device 2702 (e.g., a light-emitting diode or other light source) may be provided that illuminates vial 18 for imaging with camera 2700.

As shown in FIG. 27 one or more gears 2704 coupled to motor 2502 may be provided that engage corresponding gears on a vial puck 26 to which a vial 18 is attached at the scanning position. The vial tray 22 may be rotated so that the vial puck gears engage the rotation motor gears so that when the motor 2502 is operated the vial 18 is rotated.

FIG. 27 also shows how a magazine 2706 containing one or more manifolds may be mounted in a recess in pump head assembly 28. A magazine slot in magazine 2706 for the vapor waste manifold may be keyed to prevent accidental connection of a diluent manifold in that slot (or a waste manifold in a diluent slot in the magazine). Other diluent slots in magazine 2706 may have a common geometry and thus any diluent manifold can fit in the magazine diluent slots. One or more manifold sensors such as manifold sensor 2750 (e.g., an optical sensor) may be provided in the manifold recess in pump head assembly 28. Manifold sensor 2750 may be configured to detect the presence (or absence) of a manifold in a manifold recess (slot) in magazine 2706 to ensure that an appropriate manifold (e.g., a diluent manifold or waste manifold) is loaded at the expected position for compounding operations. In this way, the pump head may detect a manifold presence. The pump head and/or manifold sensors may communicate with the diluent load sensors to ensure proper positioning of the diluent manifolds. Various operational components 2708 such as valve actuators, needle actuators, mounting posts, a locking bayonet, and a drive pin can also be seen extended from pump head assembly 28 which are configured to secure and operate a pump cartridge 16.

Figure 28:
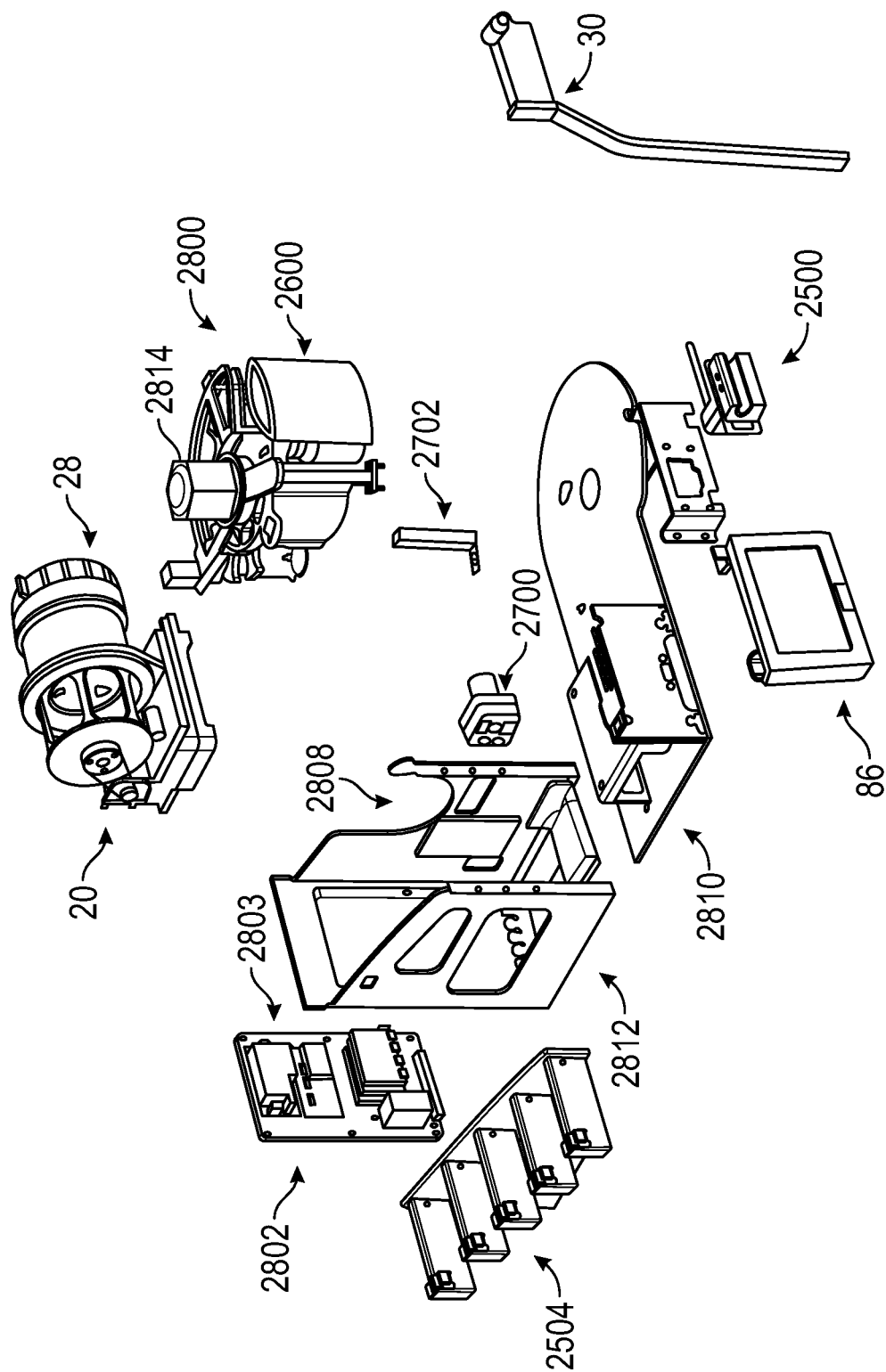
FIG. 28 illustrates an exploded perspective view of the compounding system of FIG. 24 in accordance with aspects of the present disclosure.

An exploded view of various components of compounder 10 is shown in FIG. 28. Components discussed above such as display 86, pump 2500, dose hanger 30, fluidics module 2504, pump drive 20 with pump head assembly 28, camera 2700, and lighting device 2702 are shown. Additional components such as a chassis base 2810 and chassis housing 2812 of chassis 2600 are also shown in FIG. 28. A rear panel 2802 having an electronics assembly 2803 can be mounted to chassis housing 12 and pump drive 20 may be seated in an opening 2808 in chassis housing 2812 that allows pump head assembly 28 to protrude from chassis housing 2812. Processing circuitry for managing operations of compounder system 10 may be included in electronics assembly 2803.

A vial tray and carousel drive assembly 2800 is also shown in which actuating door 2608 and a carousel hub 2814 can be seen. Carousel 14 may be placed onto carousel hub and rotated by vial tray and carousel drive assembly 2800 operating to rotate hub 2814 to move a selected cartridge in the carousel into position to be retrieved and operated by pump drive 20. Vial tray and carousel drive assembly 2800 may include separate drive assemblies for the vial tray and for the carousel such that vial tray 22 and carousel 14 may be rotated independently.

Figure 29:
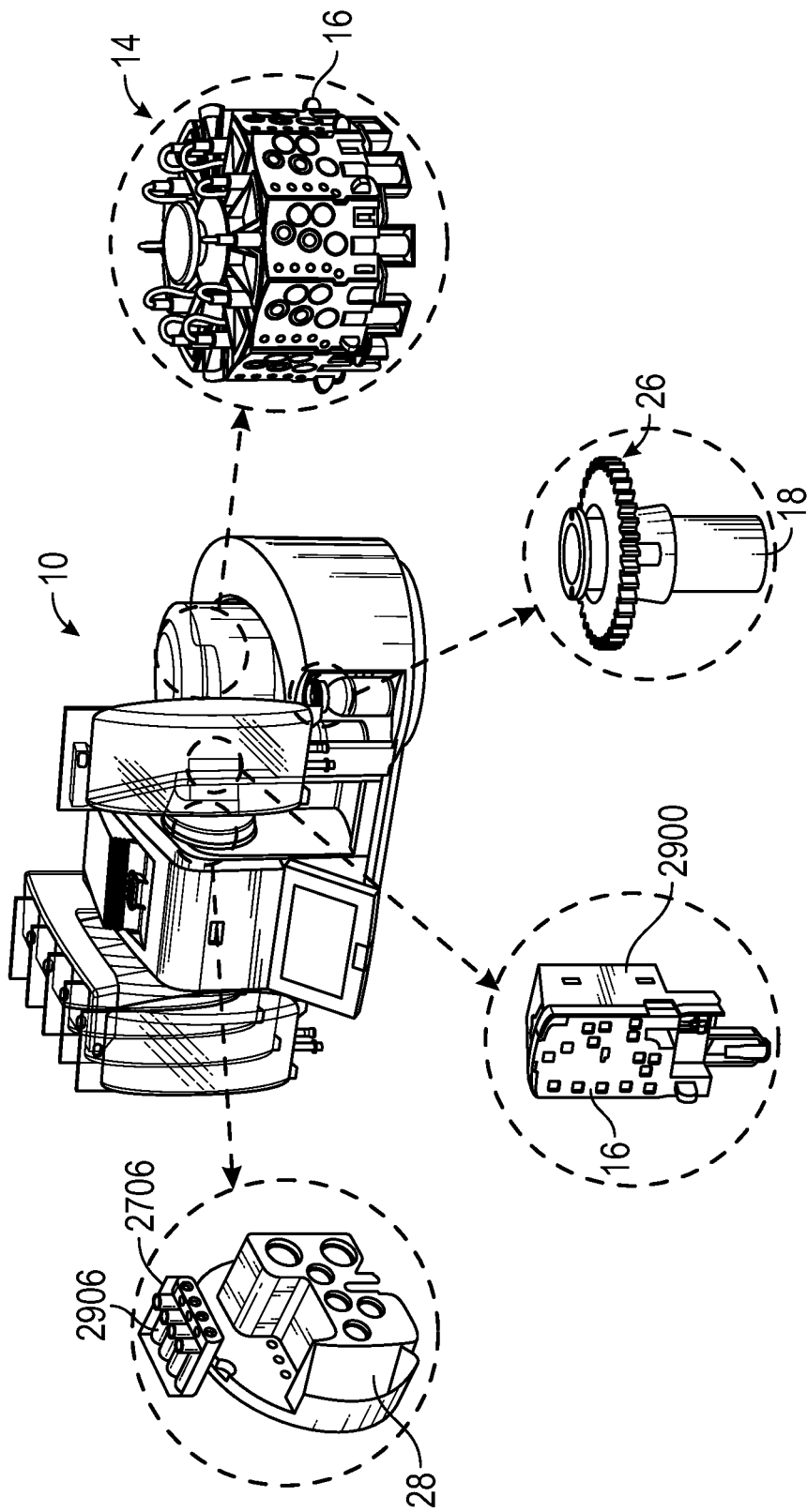
FIG. 29 illustrates a perspective view of the compounding system of FIG. 24 with various components shown in enlarged views for clarity in accordance with aspects of the present disclosure.

FIG. 29 shows another perspective view of compounder 10 highlighting the locations of various particular components such as the carousel 14 with cartridges 16 mounted therein, a cartridge 16 having a backpack 2900, a vial puck 26 for mounting vials 18, and pump head assembly 28 with a diluent magazine 2706 containing a plurality of manifolds 2906 in accordance with an embodiment. Further features of the systems and methods for reading labels of vials 18 placed in the vial tray 22 (e.g., for determining the lot number and expiration dates of medicines) will be described hereinafter in connection with FIGS. 30-34.

Figure 30:
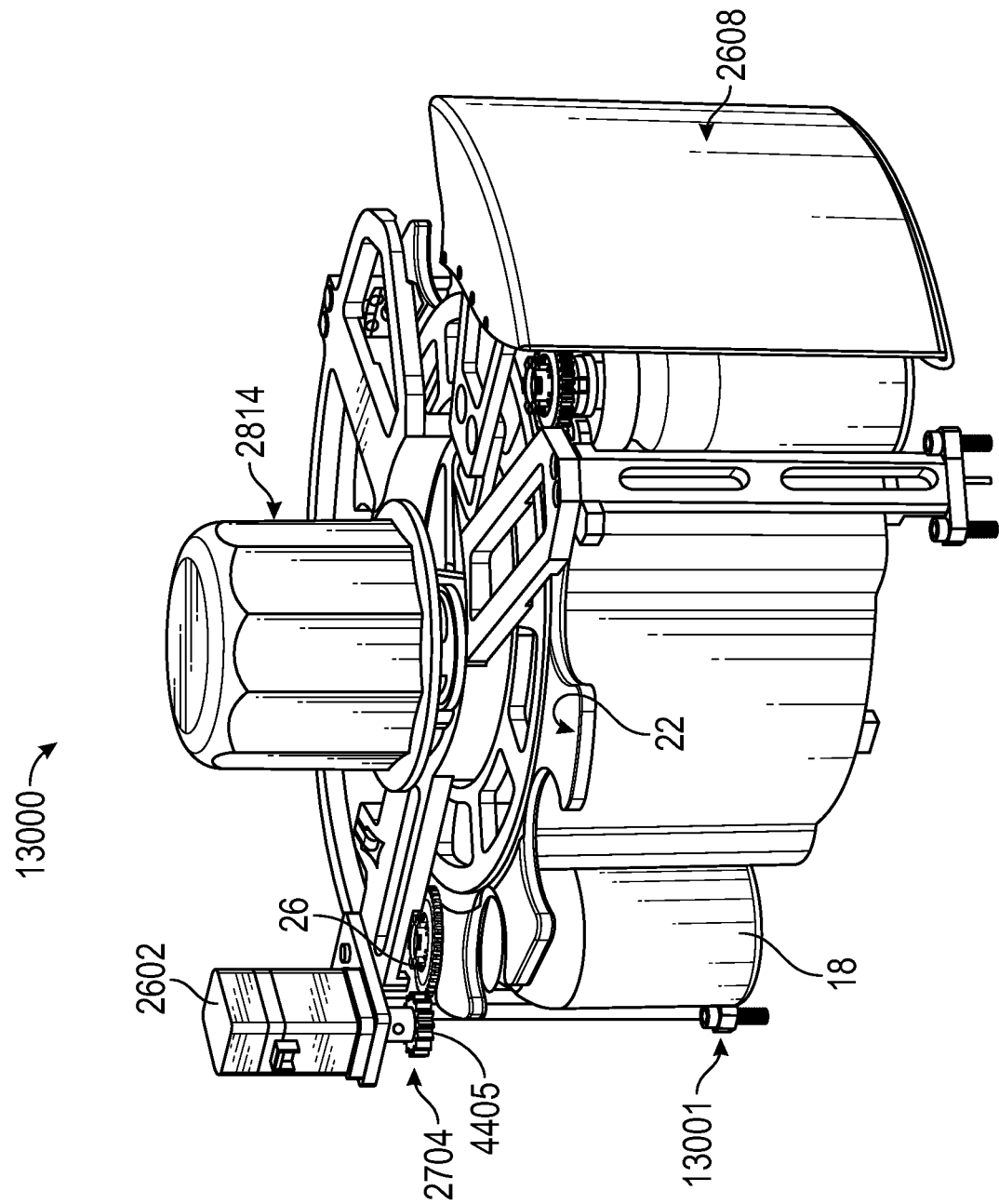
FIG. 30 illustrates a perspective view of a vial and carousel drive assembly for a compounding system in accordance with aspects of the present disclosure.

Turning now to FIG. 30, a perspective view of a vial and carousel drive assembly 3000 is shown, according to an embodiment. In the example, of FIG. 30, vial tray 22 has been rotated so that a vial 18 is in an imaging position 3001 at which the label on the vial may be imaged. In the imaging position 3001, gears 3002 of the vial puck that is attached to the vial 18 are engaged with gears 2704 of motor 2602. In this way, motor 2602 can be operated to rotate vial 18 while vial 18 is in the vial puck recess of vial tray 22 at the imaging position. While motor 2602 rotates vial 18, a camera such as 2700 (see, e.g., FIGS. 27 and 28) may capture images of the label on vial 18. A light source such as light source 2702 may be operated to illuminate at least a portion of the label while the images are captured. Light source 2702 may be a line-wise light source configured to illuminate a vertical line on the vial while the vial is rotated so that each captured image includes an image of a vertical line on the vial. The vertical line images may be combined using processing circuitry associated with the camera and/or processing circuitry such as one or more processors for the compounder system to form a rectilinear image of the entire vial label. For example, the processing circuitry for processing and extracting information from images may be formed as hardware or software as part of electronics assembly 2803 of FIG. 28.

Figure 31:
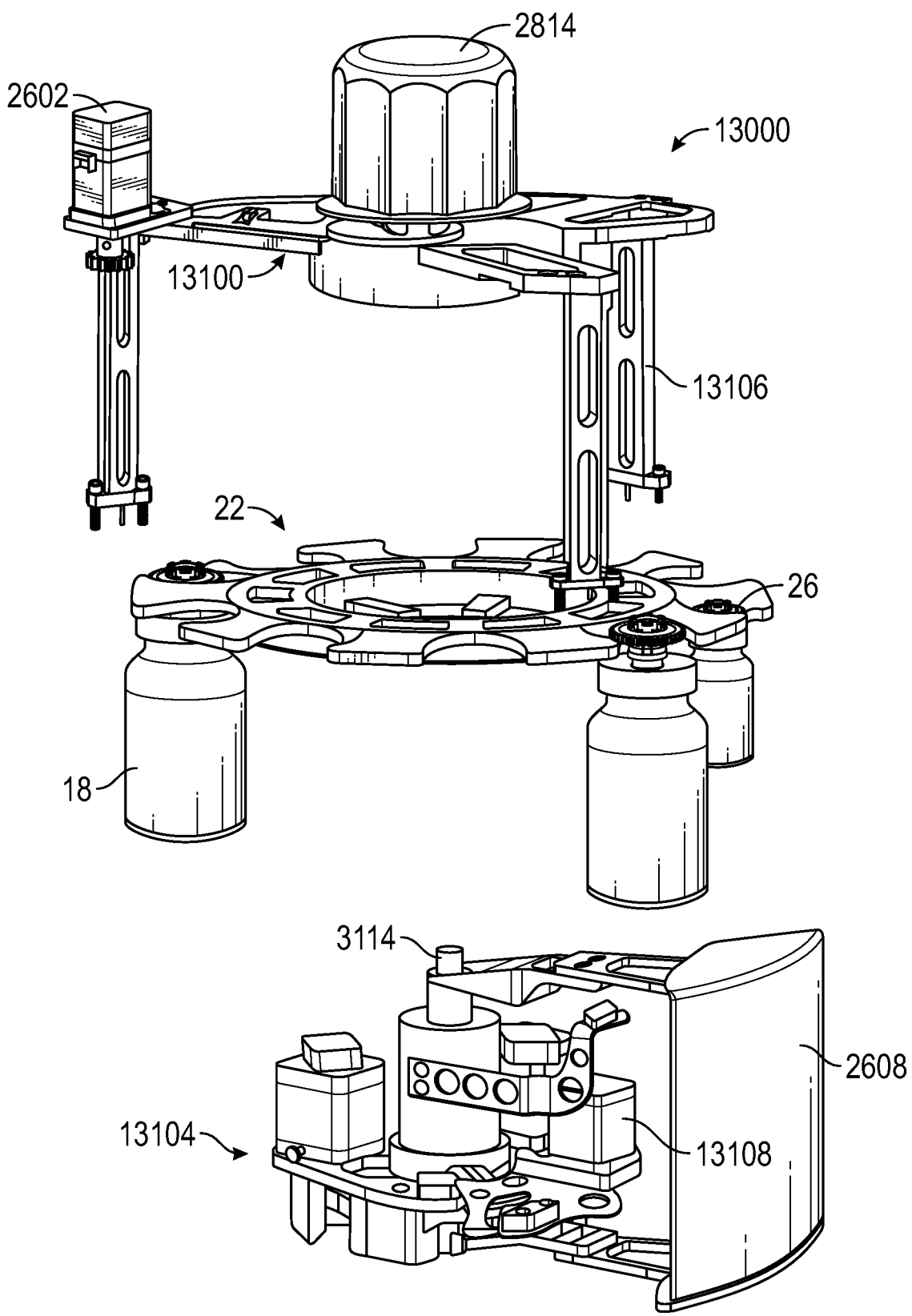
FIG. 31 illustrates an exploded perspective view of the vial and carousel drive assembly of FIG. 30 in accordance with aspects of the present disclosure.

FIG. 31 shows an exploded perspective view of the vial and carousel drive assembly 3000. As shown in FIG. 31, assembly 3000 may include a carousel support frame 3106 on which the carousel hub 3814 and vial spin drive 2602 are mounted and that includes legs 3106. Assembly 3000 may also include a drive mechanism 3104 having one or more additional motors such as motor 3108 configured via a plurality of gears and/or belts to actuate door 2608, rotate vial tray 22, and/or rotate carousel hub 2814 to rotate a carousel of cartridges mounted thereon. As shown, vial tray 22 may be disposed at least partially between carousel support frame 3100 and drive mechanism 3104.

As shown in FIGS. 30 and 31, carousel hub 2814 may have a polygonal shape. Carousel 14 may be provided with a central opening having a corresponding polygonal shape so that, when carousel 14 is placed onto carousel hub 2814 and carousel hub 2814 is rotated, the carousel is correspondingly rotated. However, this is merely illustrative. Carousel hub 2814 may be provided with other shapes such as a "D" shape or any other suitable shape that corresponds to the shape of the central opening in carousel 14 such that, when carousel 14 is placed onto carousel hub 2814 and carousel huh 2814 is rotated, the carousel is correspondingly rotated. As shown in FIG. 31, drive mechanism 3104 may have an extension 3114 that extends into carousel hub 2814 to rotate huh 2814 responsive to operation of a motor of drive mechanism 3104.

Figure 32:
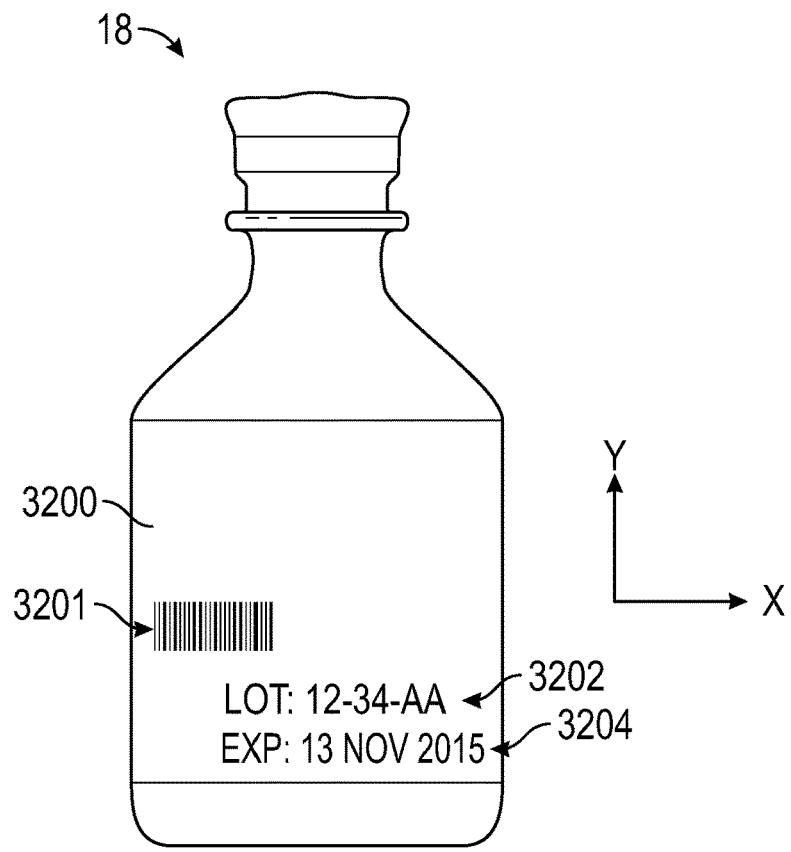
FIG. 32 illustrates a diagram of a vial having a label in accordance with aspects of the present disclosure.

FIG. 32 shows an example of a vial 18 having a label that may be read using camera 2700, light source 2702, and vial spin drive 2602. As shown in FIG. 32, vial 18 may include a label 3200 having a bar code 3201 and additional information represented in text such as a lot number 3202 and an expiration date 3204. In various circumstances, it may be important to check the lot number and/or the expiration date of a drug in vial 18 before performing reconstitution or compounding operations. For example, drug recalls can be issued based on lot number. Compounder system 10 may therefore be configured to read the lot number from each vial placed in vial tray 22 and to check whether the lot number is associated with a recall prior to using the drug in the vial. In another example, compounder system 10 may be configured to read the expiration date from each vial placed in vial tray 22 and to check whether the expiration date has passed (e.g., by comparing the expiration date with the current date).

As shown, a bar code 3201 may also be provided on label 3200. Bar code 3201 may include coded information related to the drug in the vial such as a manufacturer or a drug name, however, the bar code typically does not include the lot number and expiration date which are printed in text on the label. However, the text size, text color, font, location, and orientation at which the lot number and expiration date are printed on the vial label can vary from drug to drug and from manufacturer to manufacturer.

For example, lot number 3202 and expiration date 3204 of FIG. 32 are oriented along the x axis (e.g., horizontally on the vial) and offset in they direction (e.g., vertically offset). However, this is merely illustrative. In various scenarios, lot number 3202 and expiration date 3204 may be oriented horizontally and offset horizontally, oriented vertically and offset horizontally, oriented vertically and offset vertically, or otherwise oriented and offset. Moreover, in the example of FIG. 32, lot number 3202 and expiration date 3204 are located at the bottom of the label 3200. However, this is also illustrative and lot number 3202 and expiration date 3204 can be located at various positions on the label. Moreover, lot number 3202 and expiration date 3204 may be printed on the label using various fonts, font sizes, font colors, and any of various formats.

For example, in FIG. 32, the lot number is indicated using the characters "LOT:" and has a format with numbers and letters separated by hyphens. However, the lot number indicator and format can vary from manufacturer to manufacturer. Similarly, the expiration date is indicated using the characters "EXP:" and has a format of a single string having a 2-digit date, a three-letter month, and a four-digit year. However, the expiration date format can also vary from manufacturer to manufacturer. Due to these variations of the lot number 3202 and expiration date 3204 printed on a label disposed on typically rounded vials, compounder system 10 provides the particular advantage of being able to extract the lot number and expiration date from images of a vial captured while rotating the vial. Further features of the lot number and expiration date extraction systems and methods of compounder system 10 are discussed hereinafter in connection with the flowcharts of FIGS. 33 and 34.

Figure 33:
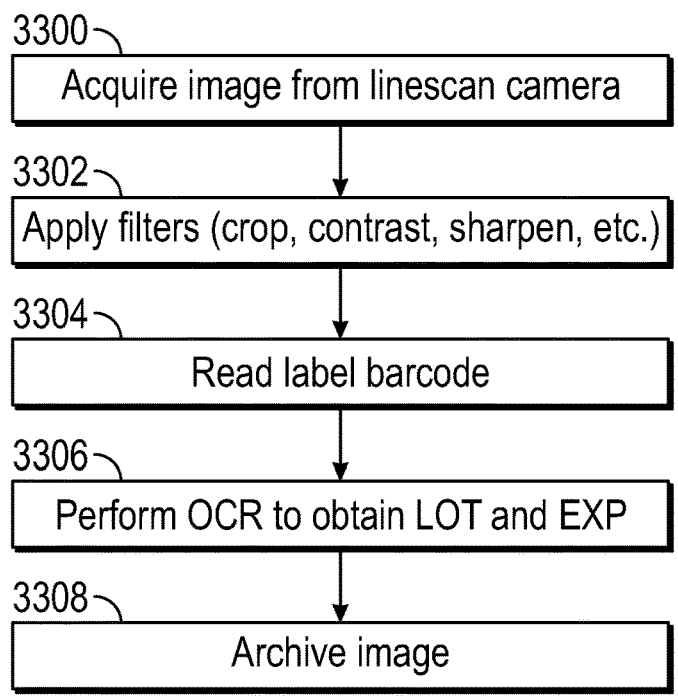
FIG. 33 is a flow chart illustrating an exemplary embodiment of the steps of a process for reading a vial label in accordance with aspects of the present disclosure.

Illustrative operations that may be performed for reading a label on a vial in the compounder system 10 are shown in FIG. 33.

At block 3300, one or more images may be acquired (captured) from a linescan camera such as camera 2700. Camera 2700 may be configured as a linescan camera by including a line-wise array of image pixels in the camera or by providing a substantially square pixel array and a line-wise illumination source that illuminates a vertical strip on the vial. Capturing the images may include providing a vial having a label in a vial tray of a compounder system, moving the vial, with the vial tray, to an imaging location, rotating the vial while the vial is in the vial tray at the imaging location, and capturing at least one image of the label while rotating the vial.

At block 3302, various image processing operations may be performed on the captured images. The image processing operations may include image combination operations in which linescan images are combined to form a rectilinear image of the entire label. The image processing operations may also include applying one or more filters to the linescan images or the combined image (e.g., a cropping filter, a contrast filter, a sharpen filter, a noise filter, or other filters that might facilitate optical character recognition in the images).

At block 3304, a label barcode may be read. Reading the label barcode may include reading the label barcode using the image of the label or using a barcode scanner in the compounder.

At block 3306, optical character recognition (OCR) operations may be performed to determine a lot number (LOT) and an expiration date (EXP) for the vial from the captured images. The OCR operations may be performed on the whole label image or a portion of the label image in which the lot number and expiration date are expected to appear. The expected location may be determined, for example, based on the barcode. For example, the manufacturer of the drug in the vial may be determined from the barcode. The system (e.g., processing circuitry of the system) may access a database of label information associated with each of various manufacturers. In one example, the system may determine that, for a particular manufacturer, the lot number and expiration date are printed in red text at the bottom of the label in 8 point font and oriented and offset horizontally. The OCR operations may then include performing OCR operations that are informed by the label information (e.g., by searching for characters in 8 point red font, horizontally oriented, and only in a portion of the image at the bottom right corner of the label image). In this way, a compounder system with efficient and accurate verification operations for each vial can be provided.

In some scenarios, the barcode information may be unavailable or non-existent. In such scenarios, the entire image may be searched and used for OCR operations and/or an expected location may be determined based on the known vial type and/or manufacturer (e.g., based on instructions provided by the compounder system to a user to insert an expected vial type or based on a known drug being reconstituted). In some embodiments, when a particular compounder system determines the location, orientation, font size, font, font color, orientation, or other aspects of a label for a particular manufacturer, the system may store that label information for later access and/or may provide the label information to a network of compounder systems for use by those systems in later compounding operations.

At block 3308, one or more captured images of the label may be stored and archived as a record of the use of that vial for a particular compounding operation. The images may be archived in connection with identifying information of the receiving container that received a reconstituted drug from the vial.

Figure 34:
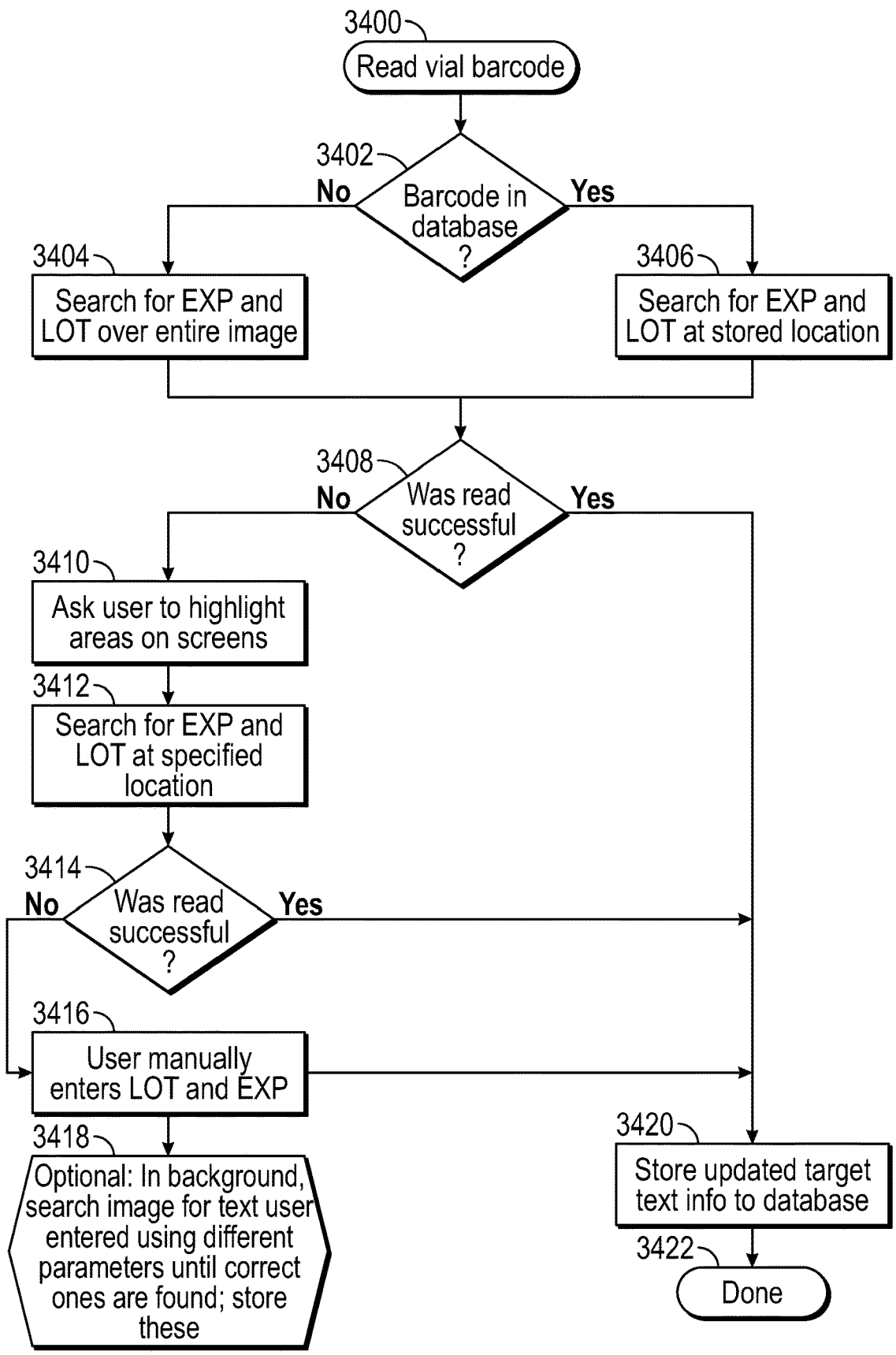
FIG. 34 is a flow chart illustrating further details of an exemplary embodiment of the steps of a process for reading a vial label in accordance with aspects of the present disclosure.

Further details of operations that may be performed for reading a lot number and/or bar code from a vial label are shown in FIG. 34.

At block 3400, a vial barcode may be read as discussed herein.

At block 3402, a compounder system may determine whether the read barcode is in a database of known barcodes (e.g., a database of the compounder system or a database of a network of compounder systems such as a cloud-based database accessible via a network by multiple compounder systems).

If it is determined at block 3402 that the barcode is in the database, label information associated with that barcode (e.g., a stored location associated with the known barcode) may be accessed and, at block 3406, the system may search for the expiration date and/or lot number at the stored location in a captured label image.

If it is determined at block 3402 that the barcode is not in the database, at block 3404 the system may search for the expiration date and/or lot number over the entire captured label image.

At block 3408, it may be determined whether the expiration date and lot number read was successful (e.g., whether the expiration date and lot number were read from the label image with a confidence score above a confidence threshold).

If it is determined at block 3408 that the read was successful, at block 3420, in addition to performing compounding operations with the vial if the lot number and expiration date are acceptable, the system may store label information such as updated target text information to a database a local database of the compounder system or a network database). At block 3422, the system may complete operations for that vial.

If it is determined at block 3408 that the read was not successful, at block 3410, a display of the system may be used to provide the label image to a user and to provide instructions to the user asking the user to highlight an area of the label image having the lot number and/or expiration date using the display screen (e.g., display screen 86 of FIG. 1 or FIG. 24).

At block 3412, the system may search for the expiration date and/or lot number at the location indicated by the user in the captured label image.

At block 3414, it may be determined whether the expiration date and lot number read in the user-specified location was successful (e.g., whether the expiration date and lot number were read from the label image with a confidence score above a confidence threshold).

If it is determined at block 3414 that the read was successful, at block 3420, in addition to performing compounding operations with the vial if the lot number and expiration date are acceptable, the system may store label information such as updated target text information to a database (e.g., a local database of the compounder system or a network database). At block 3422, the system may complete operations for that vial.

If it is determined at block 3408 that the read was not successful, at block 3416, the lot number and expiration date may be manually entered by the user (e.g., responsive to a prompt to the user on the display to enter the lot number and expiration date manually).

At block 3418, the system may optionally search the image for the text (e.g., the lot number and the expiration date) that the user entered until the entered values are found. The optional additional search may be performed to confirm the user's entry and/or to obtain search and OCR parameters to facilitate future label searches. At block 3418, the found values and any search and/or OCR parameters such as image filtering operations used to find the user-entered values may be stored (e.g., locally or on a network database) to facilitate future searches.

The subject technology is illustrated, for example, according to various aspects described above. Various examples of these aspects are described as numbered concepts or clauses (1, 2, 3, etc.) for convenience. These concepts or clauses are provided as examples and do not limit the subject technology. It is noted that any of the dependent concepts may be combined in any combination with each other or one or more other independent concepts, to form an independent concept. The following is a non-limiting summary of some concepts presented herein:

Concept 1. A compounder system, comprising:
a vial tray having a vial opening for receiving a vial containing a drug;
a camera;
a first motor configured to rotate the vial tray to move the vial to an imaging position;
a second motor configured to rotate the vial while the camera captures images of a label on the vial; and
processing circuitry configured to extract a lot number and an expiration date from the images.

Concept 2. The compounder system of Concept 1 or any other Concept, further comprising a light source configured to illuminate at least a portion of the vial at the imaging position.

Concept 3. The compounder system of Concept 2 or any other Concept, wherein the light source comprises a linewise light source.

Concept 4. The compounder system of Concept 1 or any other Concept, wherein the processing circuitry is further configured to read a bar code in the images.

Concept 5. The compounder system of Concept 4 or any other Concept, wherein the processing circuitry is further configured to determine an expected location of the lot number and the expiration date based on the bar code.

Concept 6. The compounder system of Concept 5 or any other Concept, wherein the processing circuitry is configured to extract the lot number and the expiration date from the images using the expected location.

Concept 7. The compounder system of Concept 6 or any other Concept, further comprising at least one gear coupled to the second motor, wherein the at least one gear is configured to engage a corresponding gear on a vial puck attached to the vial to rotate the vial.

Concept 8. A method, comprising:
providing a vial having a label in a vial tray of a compounder system;
moving the vial, with the vial tray, to an imaging location;
rotating the vial while the vial is in the vial tray at the imaging location;
capturing at least one image of the label while rotating the vial; and
determining at least one of a lot number and an expiration date from the at least one image.

Concept 9. The method of Concept 8 or any other Concept, wherein moving the vial comprises rotating the vial tray.

Concept 10. The method of Concept 9 or any other Concept, wherein providing the vial in the vial tray comprises placing a vial puck attached to the vial in a vial puck recess in the vial tray.

Concept 11. The method of Concept 8 or any other Concept, wherein capturing the at least one image comprises:
capturing a plurality of line scan images while the vial is rotated; and
combining the plurality of line scan images to form a rectilinear image of the entire label.

Concept 12. The method of Concept 8 or any other Concept, further comprising:
reading a barcode in the at least one image;
obtaining label information associated with the bar code, wherein the label information comprises a location, a text size, and an orientation of the lot number and the expiration date on the label; and
performing optical character recognition operations on a portion of the at least one image corresponding to the location to read the lot number and the expiration date.

Concept 13. The method of Concept 8 or any other Concept, further comprising:
following determining the at least one of the lot number and the expiration date from the at least one image, providing a location, a text size, and an orientation of the lot number and the expiration date on the label to a network of compounder systems.

Concept 14. The method of Concept 8 or any other Concept, further comprising determining whether any recalls exist that are associated with the lot number.

Concept 15. The method of Concept 14 or any other Concept, further comprising, if no recalls exist, reconstituting a drug in the vial with the compounder system.

Concept 16. The method of Concept 15 or any other Concept, further comprising archiving the at least one image in association with information for the reconstituted drug.

Concept 17. The method of Concept 8 or any other Concept, further comprising performing image processing operations on the at least one image.

Concept 18. The method of Concept 8 or any other Concept, further comprising, displaying a rectilinear image of the label.

Concept 19. The method of Concept 8 or any other Concept, further comprising storing the lot number in association with a pharmacy tech or an inventory update.

Concept 20. A compounder system, comprising:
a carousel support frame configured to rotate a carousel of pump cartridges;
a motor mounted to the carousel support frame;
a drive mechanism configured to rotate the carousel;
a vial tray interposed at least partially between the drive mechanism and the carousel support frame, wherein the drive mechanism is further configured to rotate the vial tray; and
a camera, wherein the camera is configured to capture images of a vial in the vial tray while the motor rotates the vial.

Concept 21. The compounder system of Concept 20 or any other Concept, further comprising processing circuitry configured to extract at least one of a lot number and an expiration date from the images.

Concept 22. The compounder system of Concept 21 or any other Concept, further comprising a display, wherein the processing circuitry is configured to (a) prompt a user to select a portion of the images with the lot number or the expiration date and (b) determine the lot number and the expiration date based on the user selected portion of the images.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

One or more aspects or features of the subject matter described herein may be realized in digital electronic circuitry, integrated circuitry, specially designed ASICs (application specific integrated circuits), computer hardware, firmware, software, and/or combinations thereof. For example, infusion pump systems disclosed herein may include an electronic system with one or more processors embedded therein or coupled thereto. Such an electronic system may include various types of computer readable media and interfaces for various other types of computer readable media. Electronic system may include a bus, processing unit(s), a system memory, a read-only memory (ROM), a permanent storage device, an input device interface, an output device interface, and a network interface, for example.

Bus may collectively represent all system, peripheral, and chipset buses that communicatively connect the numerous internal devices of electronic system of an infusion pump system. For instance, bus may communicatively connect processing unit(s) with ROM, system memory, and permanent storage device. From these various memory units, processing unit(s) may retrieve instructions to execute and data to process in order to execute various processes. The processing unit(s) can be a single processor or a multi-core processor in different implementations.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, or operations in the processes or methods disclosed are illustrations of exemplary approaches. Based upon implementation preferences or scenarios, it is understood that the specific order or hierarchy of steps, operations or processes may be rearranged. Some of the steps, operations or processes may be performed simultaneously. In some implementation preferences or scenarios, certain operations may or may not be performed. Some or all of the steps, operations, or processes may be performed automatically, without the intervention of a user. The accompanying method claims present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 USC. § 101, 102, or 103, nor should they be interpreted in such a way.

What is claimed is:

1. A compounder system, comprising:
   a vial tray defining a wheel, the wheel having a plurality of vial openings for simultaneously receiving a plurality of vial pucks, each vial puck attached to a top of one of a plurality of vials, each vial containing a drug;
   a camera;
   a first motor configured to rotate the wheel to move a first vial of the plurality of vials to an imaging position;
   a second motor configured to rotate the first vial within the wheel while the camera captures images of a label on the first vial;

at least one gear coupled to the second motor, wherein the at least one gear is configured to engage a corresponding gear on a first vial puck attached to the first vial to rotate the first vial; and processing circuitry configured to extract a lot number and an expiration date from the images.

2. The compounder system of claim 1, further comprising a light source configured to illuminate at least a portion of the first vial at the imaging position.

3. The compounder system of claim 2, wherein the light source comprises a line-wise light source.

4. The compounder system of claim 1, wherein the processing circuitry is further configured to read a bar code in the images.

5. The compounder system of claim 4, wherein the processing circuitry is further configured to determine an expected location of the lot number and the expiration date based on the bar code.

6. The compounder system of claim 5, wherein the processing circuitry is configured to extract the lot number and the expiration date from the images using the expected location.

7. A method, comprising:
simultaneously providing a plurality of vials, each having a label, in a wheel of a vial tray of a compounder system by placing a respective plurality of vial pucks in a plurality of vial puck recesses in the vial tray, each vial puck being attached to a top of one of the plurality of vials;
rotating, by a first motor, the wheel to move a first vial of the plurality of vials, to an imaging location;
rotating, by a gear of a second motor, a gear of the vial puck on top of the first vial within the wheel at the imaging location;
capturing at least one image of the label while rotating the first vial; and
determining at least one of a lot number and an expiration date from the at least one image.

8. The method of claim 7, wherein moving the first vial comprises rotating the vial tray.

9. The method of claim 7, wherein capturing the at least one image comprises:
capturing a plurality of line scan images while the first vial is rotated; and
combining the plurality of line scan images to form a rectilinear image of the entire label.

10. The method of claim 7, further comprising:
reading a barcode in the at least one image;
obtaining label information associated with the bar code, wherein the label information comprises a location, a text size, and an orientation of the lot number and the expiration date on the label; and
performing optical character recognition operations on a portion of the at least one image corresponding to the location to read the lot number and the expiration date.

11. The method of claim 7, further comprising:
following determining the at least one of the lot number and the expiration date from the at least one image, providing a location, a text size, and an orientation of the lot number and the expiration date on the label to a network of compounder systems.

12. The method of claim 7, further comprising determining whether any recalls exist that are associated with the lot number.

13. The method of claim 12, further comprising, if no recalls exist, reconstituting a drug in the first vial with the compounder system.

14. The method of claim 13, further comprising archiving the at least one image in association with information for the reconstituted drug.

15. The method of claim 7, further comprising performing image processing operations on the at least one image.

16. The method of claim 7, further comprising, displaying a rectilinear image of the label.

17. The method of claim 7, further comprising storing the lot number in association with a pharmacy tech or an inventory update.

18. A compounder system, comprising:
a carousel support frame configured to rotate a carousel of pump cartridges;
a motor mounted to the carousel support frame;
a drive mechanism configured to rotate the carousel;
a vial tray having a wheel interposed at least partially between the drive mechanism and the carousel support frame, wherein the drive mechanism is further configured to rotate the wheel, and the wheel is configured to simultaneously receive a plurality of vials;
at least one gear configured to engage a corresponding gear on a vial puck attached to a top of a first vial to rotate the first vial; and
a camera, wherein the camera is configured to capture images of the first vial of the plurality of vials in the vial tray while the motor rotates the first vial within the wheel.

19. The compounder system of claim 18, further comprising processing circuitry configured to extract at least one of a lot number and an expiration date from the images.

20. The compounder system of claim 19, further comprising a display, wherein the processing circuitry is configured to (a) prompt a user to select a portion of the images with the lot number or the expiration date and (b) determine the lot number and the expiration date based on the user selected portion of the images.

21. The compounder system of claim 1, wherein the first vial puck is sealingly attached to the top of the first vial and a portion of the first vial puck is configured to be pierced by a needle.

\* \* \* \* \*